US008234552B2

(12) United States Patent
Lakkis

(10) Patent No.: US 8,234,552 B2
(45) Date of Patent: Jul. 31, 2012

(54) METHOD AND APPARATUS FOR PREAMBLE CREATION AND COMMUNICATION IN A WIRELESS COMMUNICATION NETWORK

(75) Inventor: Ismail Lakkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 916 days.

(21) Appl. No.: 12/265,705

(22) Filed: Nov. 5, 2008

(65) Prior Publication Data

US 2009/0125792 A1 May 14, 2009

Related U.S. Application Data

(60) Provisional application No. 60/985,957, filed on Nov. 6, 2007.

(51) Int. Cl.
*H03M 13/00* (2006.01)

(52) U.S. Cl. ........................................................ 714/783

(58) Field of Classification Search .......... 714/778–786, 714/790, 792, 794, 795, 796, 799, 810, 821
See application file for complete search history.

(56) References Cited

U.S. PATENT DOCUMENTS 5,926,488 A * 7/1999 Khayrallah .................... 714/752
5,968,199 A * 10/1999 Khayrallah et al. .......... 714/783
6,189,125 B1 * 2/2001 Classon ........................ 714/783
6,199,189 B1 * 3/2001 Classon ........................ 714/783
6,930,996 B2 * 8/2005 Rudolf et al. ................. 370/350
7,103,386 B2 9/2006 Hoffmann et al.
7,505,529 B2 3/2009 Kwak et al.
7,672,271 B2 3/2010 Lee
7,675,989 B2 3/2010 Ahn et al.
7,779,332 B2 * 8/2010 Karr et al. ...................... 714/758
2005/0286445 A1 12/2005 Stephens
2006/0092899 A1 5/2006 Hong et al.
2007/0171933 A1 7/2007 Sammour et al.
2007/0253345 A1 11/2007 Habetha et al.
2008/0056414 A1 3/2008 Kim et al.
2008/0076370 A1 3/2008 Kotecha et al.
2008/0165875 A1 7/2008 Mundarath et al.
2008/0240031 A1 10/2008 Nassiri-Toussi et al.
2009/0073954 A1 3/2009 Maltsev et al.

(Continued)

FOREIGN PATENT DOCUMENTS

EP 1659813 A1 5/2006

(Continued)

OTHER PUBLICATIONS

Guangqi Yang et al: "Design of Synchronization Sequences in a MIMO Demonstration System" Wireless Communications and Applied Computational Electromagnetics, 20 05. IEEE/ACES International Conference on Honolulu, HI Apr. 3-7, 2005, Piscataway, NJ, USA, IEEE, Apr. 3, 2005, pp. 40-43, XP010826457.

(Continued)

*Primary Examiner* — Nadeem Iqbal
(74) *Attorney, Agent, or Firm* — Dang M. Vo

(57) ABSTRACT

A wireless communications network uses a beamforming process to increase signal quality as well as transmission capabilities and reduction of interference. An improved Golay sequence is also used in the wireless communications network. In one aspect, the processes can be used to communicate regardless of whether the system is on an OFDM mode or a single carrier mode.

35 Claims, 21 Drawing Sheets

U.S. PATENT DOCUMENTS

| | | | |
|---|---|---|---|
| 2009/0122715 | A1 | 5/2009 | Lakkis |
| 2009/0143008 | A1 | 6/2009 | Hottinen et al. |
| 2009/0207765 | A1 | 8/2009 | Yamaura |

FOREIGN PATENT DOCUMENTS

| | | |
|---|---|---|
| EP | 1816758 A2 | 8/2007 |
| KR | 19980703104 | 10/1998 |
| WO | 2007096821 | 8/2007 |

OTHER PUBLICATIONS

Jechoux B et al: "Concatenated extended complementary sequences for inter-base station synchronization in UMTS TDD mode" VTC Fall 2001. IEEE 54th. Vehiclar Technology Conference. Proceedings. Atlantic City, NJ, Oct. 7-11, 2001; [IEEE Vehicular Technology Conference], New York, NY:IEEE, US, vol. 3, Oct. 7, 2001, pp. 1691-1695, XP010562252.

Lakkis I. et al: "IEEE 802.15-0760-03-003c mmWave OFDM Physical Layer Proposal" IEEE 802.15 TG3C, Sep. 19, 2007, pp. 1-75, XP002507726.

Nortel Networks: "Clarifications on Golay-Hadamard Sequence Based RACH Preamble" 3GPP Draft; R1-99C28, 3rd Generation Partnership Project (3GPP), Mobile Competence Centre; 650, Route Des Lucioles; F-06921 Sophia-Antipolis Cedes; France, vol. tsg_ran\WG1_RL1\TSGR1_07\Docs\Pdfs, No. Hannover; 19990830, Aug. 26, 1999, XP050089422.

International Search Report—PCT/US08/082695, International Search Authority—European Patent Office—Feb. 9, 2009.

Written Opinion—PCT/US08/082695, International Search Authority—European Patent Office—Feb. 9, 2009.

Domenico Antonio Fittipaldi et al: "IEEE 802.15.3C Medium Access Controller Throughout for Phased Array Systems" IEEE International Symposium on Personal, Indoor and Mobile Radio Communicaitons. PIMRC, IEEE; PI, XX, Sep. 1, 2007, pp. 1-5, XP031168545.

Fuimihide Kojima et al: "Necessary Modificaitons on Conventional IEEE802.15.3b MAC to Achieve IEEE802.15.3c Millimeter Wave WPAN" IEEE International Symposium on Personal, Indoor and Mobile Radio Communications, PIMRC, IEEE; PI, XX, Sep. 1, 2007, pp. 1-5, XP031168693.

Penfei Xia et al: "Short Range Gigabit Wireless Communications Systems: Potentials, Challenges and Techniques" Ultra-Wideband, 2007. ICUWB 2007. IEEE International Conference on , IEEE, PI, Sep. 1, 2007, pp. 123-128, XP031159333.

Budisin, S.Z., "Efficient pulse compressor for Golay complementary sequences," Electronic Letters, 27, No. 3, pp. 219-220, Jan. 31, 1991.

Lakkis, I. et al., "A simple coherent GMSK demodulator," Personal, Indoor and Mobile Radio Communications, 2001 12th IEEE International Symposium on , vol. 1, No., pp. A-112-A-114 vol. 1, Sep. 2001.

International Search Report—PCT/US08/082698, International Search Authority—European Patent Office—Feb. 16, 2009.

Written Opinion—PCT/US08/082698, International Search Authority—European Patent Office—Feb. 16, 2009.

IEEE 802.11n/D1.0, "Part 11: Wireless LAN Medium Access Control (MAC) and Physical Layer (PHY) specifications: Enhancements for Higher Throughput," IEEE, Mar. 2006.

IEEE 802.16e/D12, "Part 16: Air Interface for Fixed and Mobile Broadband Wireless Access Systems—Amendment for Physical and Medium Access Control Layers for Combined Fixed and Mobile Operation in Licensed Bands," IEEE, Oct. 2005.

Love et al: "Grassmannian beamforming for multiple-input multiple-output wireless systems" IEEE Transactions on Information Theory, IEEE, US, vol. 49, No. 10, Oct. 1, 2003, pp. 2735-2747, XP011102252.

Wang H M et al: "Efficient MIMO channel estimation using complementary sequences," Communications, IET, vol. 1, No. 5, Oct. 4, 2007, pp. 962-969, XP006029714.

* cited by examiner

840

| Octets: 1 | 1 | 1 | 1 | 1 | | 1 | 1 |
|---|---|---|---|---|---|---|---|
| Directional Packet Type | Current Directional Beacon Identifier | Number of Superframes per Beamforming Cycle | Number of Directional Preambles per Superframe | Current Q-omni Beacon Identifier (4 bits) | Number of Q-omni Beacons (4 bits) | Length ( = 5 ) | Element ID |
| 842 | 844 | 846 | 848 | 850 | 852 | 854 | 856 |

| Octets: 8 | 1 | 1 | 1 | 3 | 3 | 3 | 3 | 6 |
|---|---|---|---|---|---|---|---|---|
| PNC Address | PNC Response | Piconet Mode | MAX TX Power Level | Duration per S-CAP | Number of S-CAP Periods | CAP End time | Superframe Duration | Time Token |
| 862 | 864 | 866 | 868 | 870 | 872 | 874 | 876 | 878 |

FIG. 8B

| Octets: 3 | 1 | 1 | 1 | 1 |
|---|---|---|---|---|
| Q-Omni Listening Period Duration | Number of Q-Omni Listening Periods | Current Q-Omni Packet Identifier | Length ( = 5) | Element ID |
| 1301 | 1302 | 1303 | 1304 | 1305 |

FIG. 12A

| Octets: 3 | 1 | 1 | 1 | 1 | 1 | 1 | 1 |
|---|---|---|---|---|---|---|---|
| DEV2 Directional Capability | DEV1 Preferred Direction #2 | DEV1 Preferred Direction #1 | DEV2 Preferred Direction #1 | DEV2 Preferred Direction #1 | DEV2 Number Of Q-Omni directions | Length ( = 11) | Element ID |
| 1321 | 1322 | 1323 | 1324 | 1325 | 1326 | 1327 | 1328 |

FIG. 12B

| Octets: 3 | 1 | 1 | 1 | 1 | 1 | 3 | 1 | 1 |
|---|---|---|---|---|---|---|---|---|
| Directional Preamble Type | Number Of Superframes Per Beamforming Cycle | Number Of Sub-Cycles Per Superframe | Number Of Directional Preambles Per Sub-Cycle | Q-Omni Listening Period duration | Current Q-Omni Packet Identifier | CTA End time | Length ( = 11) | Element ID |
| 1401 | 1402 | 1403 | 1404 | 1405 | 1406 | 1407 | 1408 | 1409 |

FIG. 13B

| Octets:1 | ... | 1 | 1 | 1 | 1 |
|---|---|---|---|---|---|
| LQF-N | ... | LQF-2 | LQF-1 | Length ( = N) | Element ID |
| 1423-N | | 1423-2 | 1423-1 | 1422 | 1421 |

FIG. 13C

METHOD AND APPARATUS FOR PREAMBLE CREATION AND COMMUNICATION IN A WIRELESS COMMUNICATION NETWORK

CROSS-REFERENCE TO RELATED APPLICATIONS

This application claims priority under 35 U.S.C. 119(e) to U.S. Provisional Application Ser. No. 60/985,957, filed Nov. 6, 2007, entitled "OFDM preambles for beamforming and data packets."

BACKGROUND

I. Field of the Disclosure

This disclosure relates generally to wireless communication systems and, more particularly, to wireless data transmission in a wireless communication system.

II. Description of the Related Art

In one aspect of the related art, devices with a physical (PHY) layer supporting either single carrier or Orthogonal Frequency Division Multiplexing (OFDM) modulation modes may be used for millimeter wave communications, such as in a network adhering to the details as specified by the Institute of Electrical and Electronic Engineers (IEEE) in its 802.15.3c standard. In this example, the PHY layer may be configured for millimeter wave communications in the spectrum of 57 gigahertz (GHz) to 66 GHz and specifically, depending on the region, the PHY layer may be configured for communication in the range of 57 GHz to 64 GHz in the United States and 59 GHz to 66 GHz in Japan.

To allow interoperability between devices or networks that support either OFDM or single-carrier modes, both modes further support a common mode. Specifically, the common mode is a single-carrier base-rate mode employed by both OFDM and single-carrier transceivers to facilitate co-existence and interoperability between different devices and different networks. The common mode may be employed to provide beacons, transmit control and command information, and used as a base rate for data packets.

A single-carrier transceiver in an 802.15.3c network typically employs at least one code generator to provide spreading of the form first introduced by Marcel J. E. Golay (referred to as Golay codes), to some or all fields of a transmitted data frame and to perform matched-filtering of a received Golay-coded signal. Complementary Golay codes are sets of finite sequences of equal length such that a number of pairs of identical elements with any given separation in one sequence is equal to the number of pairs of unlike elements having the same separation in the other sequences. S. Z. Budisin, "Efficient Pulse Compressor for Golay Complementary Sequences," Electronic Letters, 27, no. 3, pp. 219-220, Jan. 31, 1991, which is hereby incorporated by reference, shows a transmitter for generating Golay complementary codes as well as a Golay matched filter.

For low-power devices, it is advantageous for the common mode to employ a Continuous Phase Modulated (CPM) signal having a constant envelope so that power amplifiers can be operated at maximum output power without affecting the spectrum of the filtered signal. Gaussian Minimum Shift Keying (GMSK) is a form of continuous phase modulation having compact spectral occupancy by choosing a suitable bandwidth time product (BT) parameter in a Gaussian filter. The constant envelope makes GMSK compatible with nonlinear power amplifier operation without the concomitant spectral regrowth associated with non-constant envelope signals.

Various techniques may be implemented to produce GMSK pulse shapes. For example, $\pi/2$-binary phase shift key (BPSK) modulation (or $\pi/2$-differential BPSK) with a linearized GMSK pulse may be implemented, such as shown in I. Lakkis, J. Su, & S. Kato, "A Simple Coherent GMSK Demodulator", IEEE Personal, Indoor and Mobile Radio Communications (PIMRC) 2001, which is incorporated by reference herein, for the common mode.

SUMMARY

Aspects disclosed herein may be advantageous to systems employing millimeter-wave wireless personal area networks (WPANs) such as defined by the IEEE802.15.3c protocol. However, the disclosure is not intended to be limited to such systems, as other applications may benefit from similar advantages.

According to an aspect of the disclosure, a method of communication is provided. More specifically, the method includes obtaining an extended Golay code selected from a set of extended Golay codes; modifying the extended Golay code; generating a preamble using the modified extended Golay code; and transmitting the preamble.

According to another aspect of the disclosure, a communications apparatus is provided. The communication apparatus includes means for obtaining an extended Golay code selected from a set of extended Golay codes; means for modifying the extended Golay code; means for generating a preamble using the modified extended Golay code; and means for transmitting the preamble.

According to another aspect of the disclosure, an apparatus for communications is provided. The communications apparatus includes a processing system configured to obtain an extended Golay code selected from a set of extended Golay codes; modify the extended Golay code; generate a preamble using the modified extended Golay code; and transmit the preamble.

According to another aspect of the disclosure, a computer-program product for wireless communications is provided. The computer-program product includes a machine-readable medium encoded with instructions executable to obtain an extended Golay code selected from a set of extended Golay codes; modify the extended Golay code; generate a preamble using the modified extended Golay code; and transmit the preamble.

According to another aspect of the disclosure, a piconet coordinator is provided. The piconet coordinator includes an antenna; and a processing system configured to obtain an extended Golay code selected from a set of extended Golay codes; modify the extended Golay code; generate a preamble using the modified extended Golay code; and transmit the preamble via the antenna.

According to another aspect of the disclosure, a method of communication is provided. More specifically, the method includes transmitting a plurality of quasi-omni packets from a first device, each quasi-omni packet being transmitted in a particular quasi-omni pattern; and, transmitting a plurality of preambles from the first device, each preamble being transmitted in one of a plurality of directional patterns.

According to another aspect of the disclosure, a communications apparatus is provided, the communication apparatus includes means for transmitting a plurality of quasi-omni packets from a first device, each quasi-omni packet being transmitted in a particular quasi-omni pattern; and means for transmitting a plurality of preambles from the first device, each preamble being transmitted in one of a plurality of directional patterns.

According to another aspect of the disclosure, an apparatus for communications is provided. The communications apparatus includes a processing system configured to transmit a plurality of quasi-omni packets from a first device, each quasi-omni packet being transmitted in a particular quasi-omni pattern; and transmit a plurality of preambles from the first device, each preamble being transmitted in one of a plurality of directional patterns.

According to another aspect of the disclosure, a computer-program product for wireless communications is provided. The computer-program product includes a machine-readable medium encoded with instructions executable to transmit a plurality of quasi-omni packets from a first device, each quasi-omni packet being transmitted in a particular quasi-omni pattern; and transmit a plurality of preambles from the first device, each preamble being transmitted in one of a plurality of directional patterns.

According to another aspect of the disclosure, a piconet coordinator is provided. The piconet coordinator includes an antenna; and a processing system configured to transmit a plurality of quasi-omni packets from a first device, each quasi-omni packet being transmitted in a particular quasi-omni pattern; and transmit a plurality of preambles from the first device, each preamble being transmitted in one of a plurality of directional patterns.

According to another aspect of the disclosure, a method of communication is provided. More specifically, the method includes detecting at least one quasi-omni packet of a plurality of quasi-omni packets transmitted in a plurality of quasi-omni patterns from a first device; detecting a preamble transmitted in a directional pattern from the first device; determining a preferred pattern including at least one of a quasi-omni pattern and a directional pattern; and transmitting a feedback including the preferred pattern to the first device.

According to another aspect of the disclosure, a communication apparatus is provided. The communication apparatus includes means for detecting at least one quasi-omni packet of a plurality of quasi-omni packets transmitted in a plurality of quasi-omni patterns from a first device; means for detecting a preamble transmitted in a directional pattern from the first device; means for determining a preferred pattern including at least one of a quasi-omni pattern and a directional pattern; and means for transmitting a feedback including the preferred pattern to the first device.

According to another aspect of the disclosure, an apparatus for communications is provided. The communications apparatus includes a processing system configured to detect at least one quasi-omni packet of a plurality of quasi-omni packets transmitted in a plurality of quasi-omni patterns from a first device; detect a preamble transmitted in a directional pattern from the first device; determine a preferred pattern including at least one of a quasi-omni pattern and a directional pattern; and transmit a feedback including the preferred pattern to the first device.

According to another aspect of the disclosure, a computer-program product for wireless communications is provided. The computer-program product includes a machine-readable medium encoded with instructions executable to detect at least one quasi-omni packet of a plurality of quasi-omni packets transmitted in a plurality of quasi-omni patterns from a first device; detect a preamble transmitted in a directional pattern from the first device; determine a preferred pattern including at least one of a quasi-omni pattern and a directional pattern; and transmit a feedback including the preferred pattern to the first device.

According to another aspect of the disclosure, a communications device is provided. The communications device includes an antenna; and a processing system configured to detect at least one quasi-omni packet of a plurality of quasi-omni packets transmitted in a plurality of quasi-omni patterns from a first device; detect a preamble transmitted in a directional pattern from the first device; determine a preferred pattern including at least one of a quasi-omni pattern and a directional pattern; and transmit a feedback including the preferred pattern to the first device.

Although particular aspects are described herein, many variations and permutations of these aspects fall within the scope of the disclosure. Whereas some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following Detailed Description. The detailed description and drawings are merely illustrative of the disclosure rather than limiting, the scope of the disclosure being defined by the appended claims and equivalents thereof.

BRIEF DESCRIPTION OF THE DRAWINGS

Aspects according to the disclosure are understood with reference to the following figures.

FIGS. 8A and 8B are beamforming and superframe information elements configured in accordance with one aspect of the disclosure;

FIGS. 12A and 12B relate to a Q-omni information element transmitted from a first device to a second device as part of a Q-omni frame transmission and the feedback information element transmitted from the second device back to the first device;

FIGS. 13A to 13C illustrate a directional phase of on-demand beamforming configured in accordance with an aspect of the disclosure;

Figure 1:
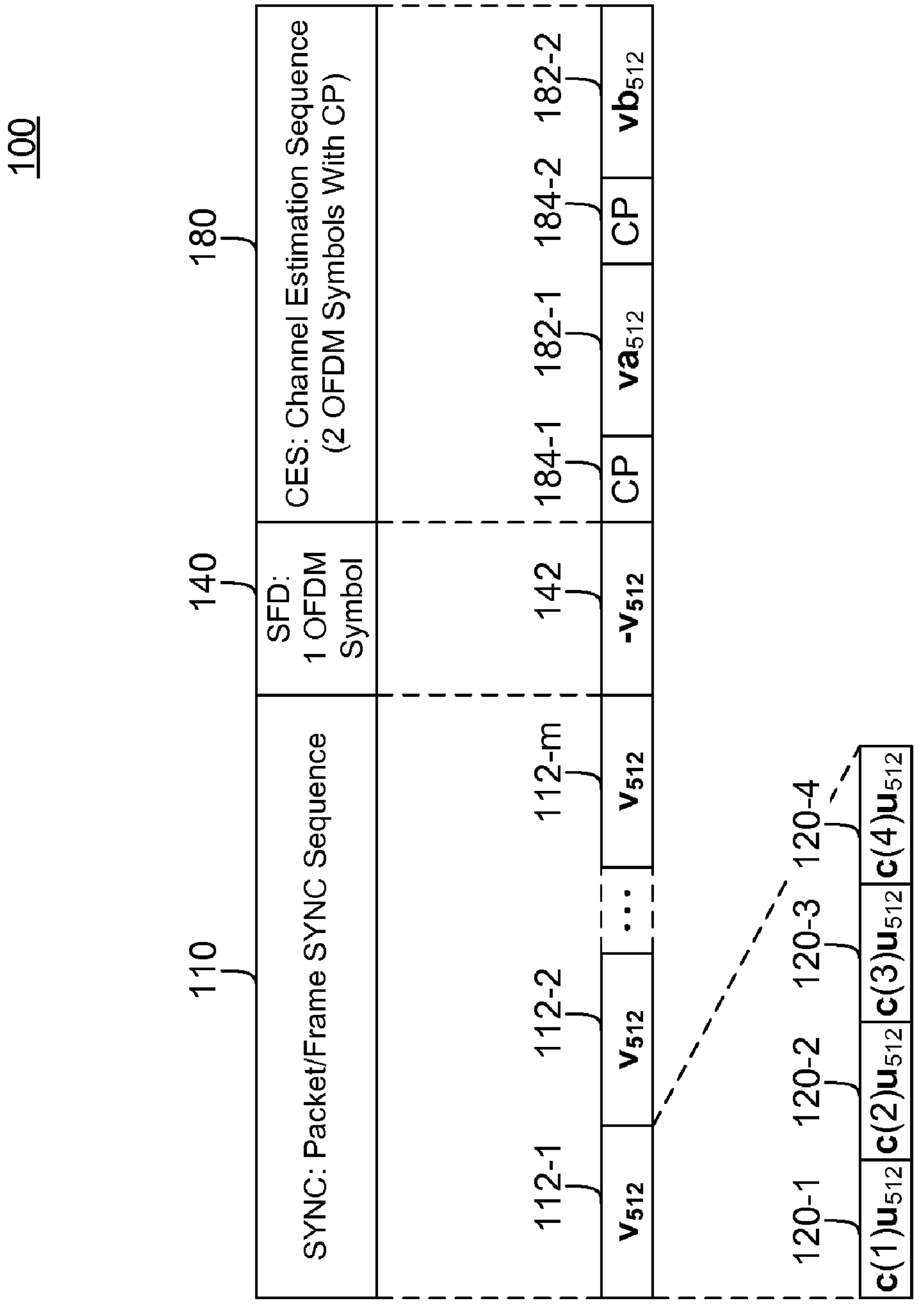
FIG. 1 is a representation of a preamble for an OFDM communication signal in accordance with an aspect of the disclosure.

In accordance with common practice the various features illustrated in the drawings may be simplified for clarity. Thus, the drawings may not depict all of the components of a given apparatus (e.g., device) or method. In addition, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein are merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

In the following description, for the purposes of explanation, numerous specific details are set forth in order to provide a thorough understanding of the disclosure. It should be understood, however, that the particular aspects shown and described herein are not intended to limit the disclosure to any particular form, but rather, the disclosure is to cover all modifications, equivalents, and alternatives falling within the scope of the disclosure as defined by the claims.

In one aspect of the disclosure, a dual-mode millimeter wave system employing single-carrier modulation and OFDM is provided with a single-carrier common signaling. The OFDM sampling frequency is 2592 MHz, and OFDM transceivers in this aspect are configured to perform a fast Fourier transform (FFT) of size 512, where only 352 of the 512 subcarriers are used, yielding a bandwidth of 1782 MHz. Of the used subcarriers, 336 subcarriers are data-bearing and 16 subcarriers are pilots.

FIG. 1 is a representation of a preamble structure 100 for an OFDM communication signal in accordance with an aspect of the disclosure. The preamble structure 100 includes a packet sync sequence field 110, a start frame delimiter (SFD) field 140, and a channel-estimation sequence (CES) field 180. For an OFDM symbol of length N, the Kronecker (kron) product of a cover sequence of length L with a modified Golay sequence of length M=N/L is used as a base sequence v of length N:

$$v = kron(c,u),$$

where c is the cover sequence of length L, and u is the modified Golay sequence of length M. One set of cover sequences is a subset of the following sequences of length L:

$$\text{IFFT}([0\ 0\ \ldots\ 0\ 1\ 0\ \ldots\ 0]),$$

where IFFT is an inverse fast Fourier transform operation, and the sequence in parentheses has only one nonzero element. The position of the nonzero element may be varied to obtain different sets of cover sequences. In accordance with various aspects of the disclosure, each of a plurality of piconets is configured to use one or more of the base sequences for its preamble.

In one aspect of the disclosure, for an FFT size of 512 (i.e., M=512) and a modified Golay sequence of length 128 (i.e., M=128), the following length-4 cover codes (i.e., L=4) are used:

$$c(1) = \text{IFFT}([1\ 0\ 0\ 0]) = [1\ 1\ 1\ 1];$$

$$c(2) = \text{IFFT}([0\ 1\ 0\ 0]) = [1\ j\ -1\ -j];$$

$$c(3) = \text{IFFT}([0\ 0\ 1\ 0]) = [1\ -1\ 1\ -1];\ \text{and}$$

$$c(4) = \text{IFFT}([0\ 0\ 0\ 1]) = [1\ -j\ -1\ j].$$

A first piconet controller (PNC) uses Golay sequence a1 with cover code c1 to form a first base sequence:

$$v1 = [+a1\ +a1\ +a1\ +a1]\ \text{of length 512.}$$

A second PNC uses Golay sequence a2 with cover code c2 to form a second base sequence:

$$v2 = [+a2\ +j.a2\ -a2\ -ja2]\ \text{of length 512.}$$

A third PNC uses Golay sequence a3 with cover code c3 to form a third base sequence:

$$v3 = [+a3\ -a3\ +a3\ -a3]\ \text{of length 512.}$$

A fourth PNC uses Golay sequence a4 with cover code c4 to form a fourth base sequence:

$$v4 = [+a4\ -j.a4\ -a4\ +ja4]\ \text{of length 512.}$$

The FFTs of the four base sequences, v1, v2, v3, and v4 are orthogonal to each other, as they occupy different OFDM subcarrier bins in the frequency domain. For example, v1 occupies bins 0, 4, 8, . . . , v2 occupies bins 1, 5, 9, . . . , v3 occupies bins 2, 6, 10, . . . , and v4 occupies bins 3, 7, 11, . . . . This helps mitigate interference between the preambles of the four piconets, and helps provide for improved frequency reuse and spatial reuse.

In one aspect of the disclosure, a regular Golay sequence (e.g., a1) is used to form a modified Golay sequence, b1. Although b1 occupies only 128 sub-carrier bins (i.e., subcarriers 0,4,8 . . . ), the total bandwidth comprises the entire 2592 MHz channel bandwidth since there is no guard band. The subcarriers corresponding to the size-512 FFT may be numbered from −256 to 255, which correspond to a bandwidth of 2592 MHz. Sub-carriers −176 to 176 denote to the useful bandwidth employed for the data and pilots, whereas the subcarriers outside the range of −176 to 176 may be used as guard bands.

Figure 2A:
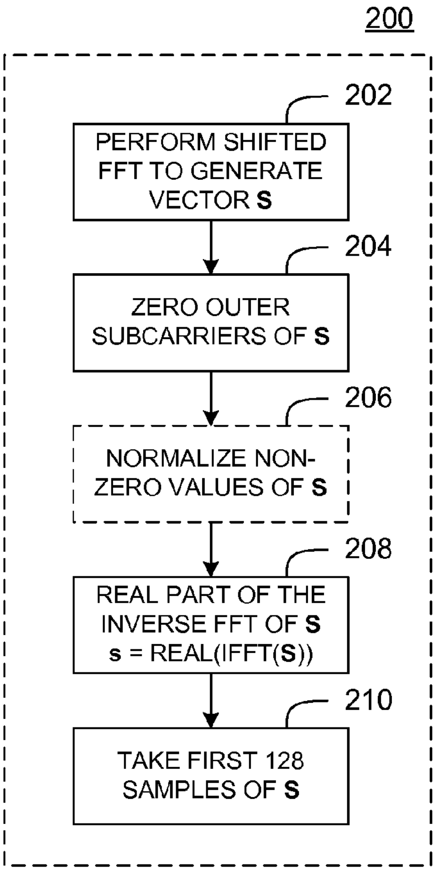
FIGS. 2A and 2B are flow charts for generating a modified Golay sequence from a regular Golay sequence in accordance with various aspect of the disclosure.

FIG. 2A illustrates a modified Golay sequence generation process 200 for generating a modified Golay sequence u from a regular Golay sequence a in accordance with one aspect of the disclosure. In step 202, an FFT shift operation is provided to produce vector S, where:

$$S = \text{fftshift}(\text{fft}([a\ a\ a\ a]))$$

is a length-512 vector, and the operator fftshift centers the FFT (i.e., it maps a sequence [0:511] to a centered sequence [−256:255]. In step 204, subcarrier values of S outside a predetermined bandwidth are set to zero. For example, the subcarriers outside the range [−176:176] may be attenuated or zeroed. In an optional step 206, the amplitude of S within the range [−176:176] may be normalized. In step 208, real values of the IFFT of S are used to form a length-512 vector s:

$$s=\mathrm{real}(\mathrm{ifft}(S)).$$

In step 210, a modified Golay sequence u is generated from the first 128 samples of s:

$$u=s(1:128).$$

Figure 2B:
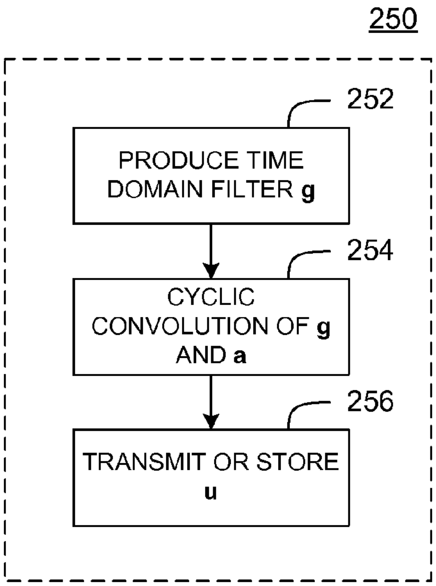

FIG. 2B illustrates a second modified Golay sequence generation process 250 for generating a second modified Golay sequence u in accordance with an aspect of the disclosure. In this approach, the generation of a modified Golay sequence is based on the modified Golay sequence being a cyclic convolution between a regular Golay sequence and a short time-domain filter g. The time-domain filter g is configured to limit the bandwidth of the resulting sequence to the actual bandwidth used for data transmission.

Figure 3A:
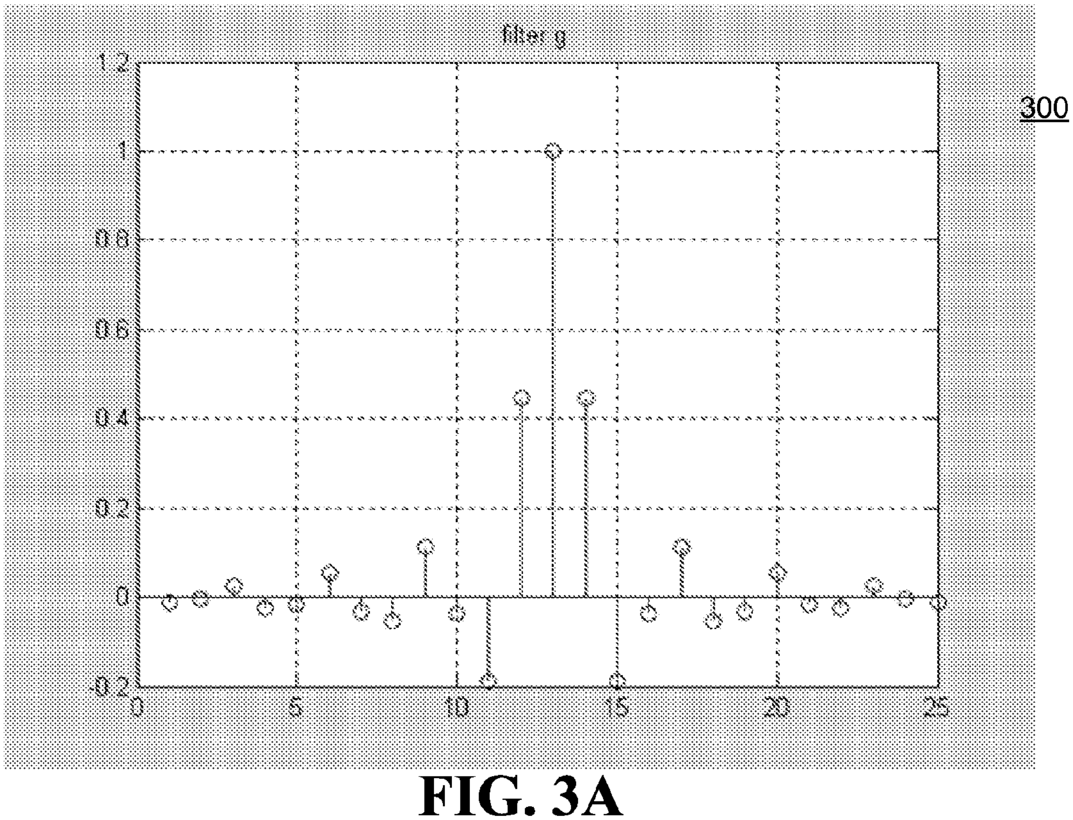
FIGS. 3A and 3B is a plot of a time-domain filter configured in accordance with one aspect of the disclosure and the resulting spectrum plot for a modified Golay sequence.
Figure 3B:
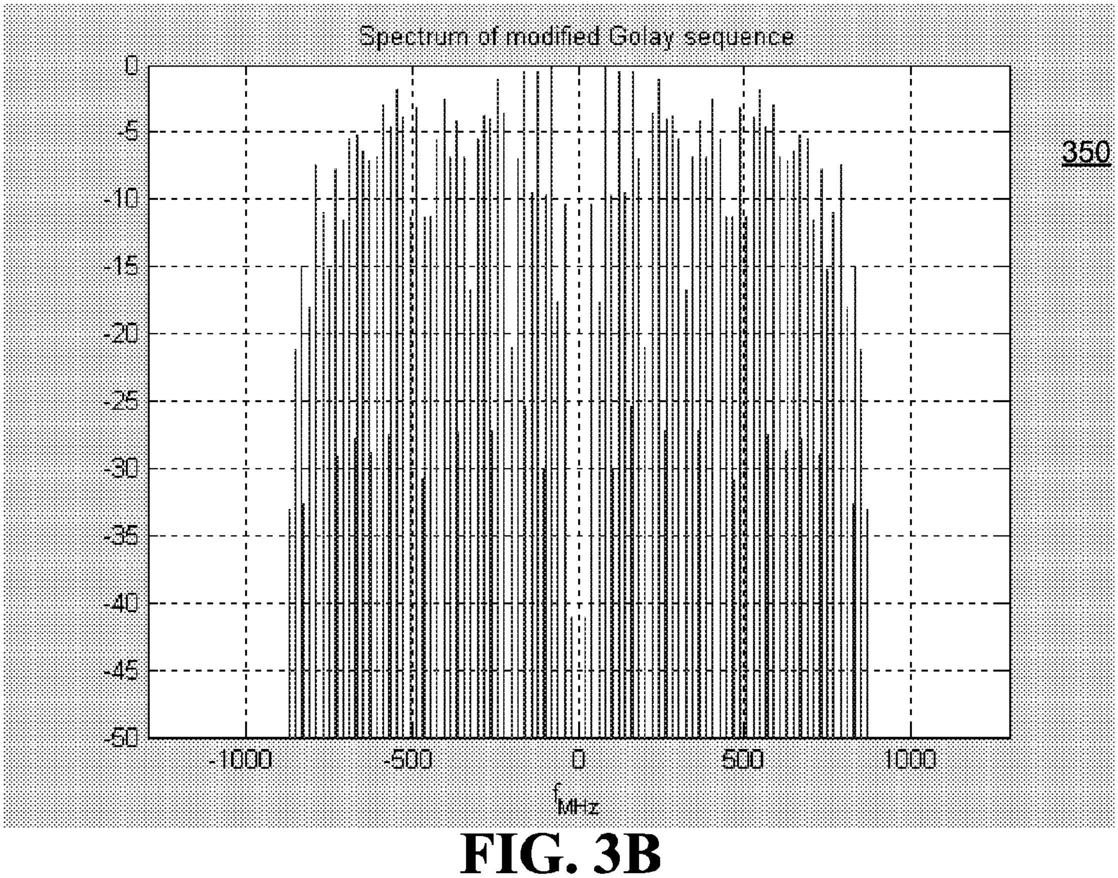

In step 252, a time domain filter g of length $L_g$ that has a bandwidth equal to a selected bandwidth, which in one example is a bandwidth of 1782 MHz, is provided. An example of the time domain filter g is represented by a plot 300 in FIG. 3A. The 3-dB bandwidth of the channel bandwidth is one of many design parameters for determining the used bandwidth, and consequently for yielding any of various filters. In step 254, the modified Golay sequence u is generated from a cyclic convolution of g and a regular Golay code a. In step 256, the resulting multi-level, non-binary sequence may be transmitted or stored. A spectrum plot 350 of the modified Golay sequence u is shown in FIG. 3B.

Receivers configured in accordance with method and apparatus aspects of the disclosure may provide for matched filtering relative to filter g. In one aspect, a receiver may include a filter matched to g, followed by a filter matched to the regular Golay code. Receivers employed in accordance with aspects of the disclosure may be provided with a parallel receiving architecture.

In one aspect of the disclosure, subcarriers of each base sequence are interleaved in frequency, and thus each base sequence occupies a quarter of the used channel bandwidth. In the absence of time and frequency synchronization, however, interference may occur between piconets employing interleaved subcarriers. For example, a subcarrier 4 belonging to a PNC 1 may have adjacent subcarriers 3 and 5 belonging to a PNC 4 and a PNC 2, respectively. In the absence of time and/or frequency synchronization, the subcarriers 3 and 5 may leak into subcarrier 4, resulting in interference.

In one approach of addressing the interference caused by leakage, different cover sequences may be employed. For example, four cover sequences, each of length 8, may be provided as follows:

$$C1=\mathrm{ifft}([1\ 0\ 0\ 0\ 0\ 0\ 0\ 0])=[+1\ +1\ +1\ +1\ +1\ +1\ +1\ +1],$$

$$C2=\mathrm{ifft}([0\ 0\ 1\ 0\ 0\ 0\ 0\ 0])=[+1\ +j\ -1\ -j\ +1\ +j\ -1\ -j],$$

$$C3=\mathrm{ifft}([0\ 0\ 0\ 0\ 1\ 0\ 0\ 0])=[+1\ -1\ +1\ -1\ +1\ -1\ +1\ -1],$$

and $$C4=\mathrm{ifft}([0\ 0\ 0\ 0\ 0\ 0\ 1\ 0])=[+1\ -j\ -1\ +j\ +1\ -j\ -1\ +j].$$

These cover sequences may be combined with a modified Golay sequence of length 64 to generate four base sequences of length 512, wherein each one occupies only $\frac{1}{8}^{th}$ of the used frequency band. Thus, each active subcarrier is surrounded by 2 inactive (or null) subcarriers, thus reducing the interference. Alternative aspects of the disclosure may be configured for different cover-sequence lengths.

Referring again to FIG. 1, the Channel Estimation Sequence (CES) 180 includes a pair of complementary modified Golay sequences va 182-1 and vb 182-2 produced from two length-512 complementary Golay sequences a and b. Each of the pair of modified Golay sequences va 182-1 and vb 182-2 are preceded by a Cyclic Prefix (CP) 184-1 and CP 184-2, respectively. No cover sequences are used to generated the pair of modified Golay sequences va 182-1 and vb 182-2. The pair of modified Golay sequences va 182-1 and vb 182-2 are complementary, which allows for perfect channel estimation in either the time domain or the frequency domain. In an alternative approach, two length-128 complementary Golay sequences a and b, and two length-4 cover sequences may be used to generate the pair of length-512 complementary modified Golay sequences va 182-1 and vb 182-2. The modified Golay sequences va 182-1 and vb 182-2 are complementary over length 128, thus still allowing for perfect channel time estimation in either time or frequency domains. In the time domain, channel estimation is provided over a length 128 Golay sequence. In the frequency domain, because only a quarter of the subcarriers are populated; channel estimation will require the use of interpolation.

In one aspect, the CES 180 may be repeated periodically to facilitate channel tracking. In this case, the CES 180 is referred to as a pilot CES (PCES). Three periods are provided, and they correspond to rates of 1, 3, and 6 ms.

Figure 4:
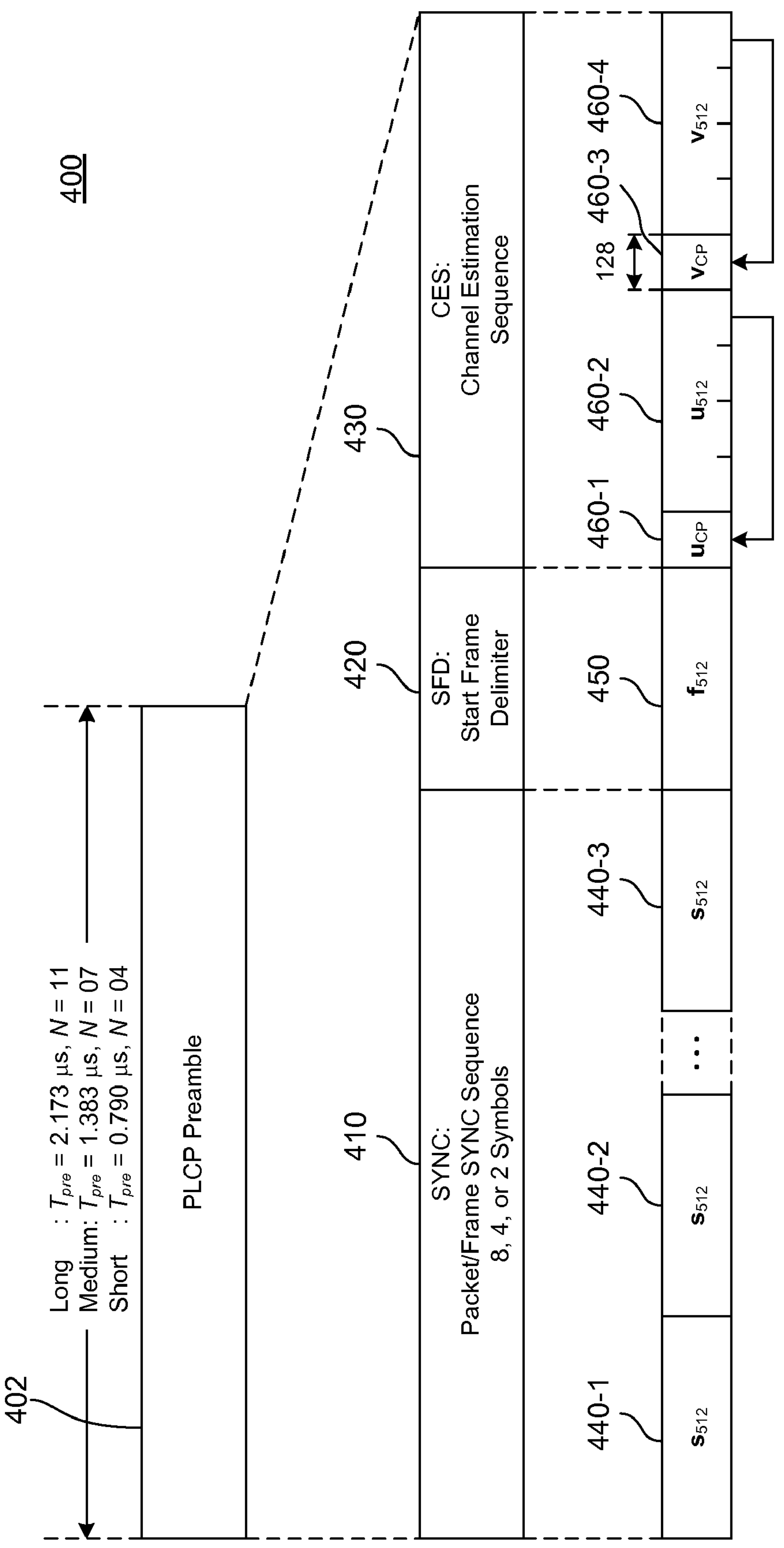
FIG. 4 is a structure diagram of a preamble having various lengths in accordance with various aspect of the disclosure.

FIG. 4 illustrates a preamble 400 in accordance with aspects of the disclosure. Three preambles are defined as follows:

- Long preamble: 8 sync symbols, 1 SFD symbol, 2 CES symbols
- Medium preamble: 4 sync symbols, 1 SFD symbol, 2 CES symbols
- Short preamble: 2 sync symbols, 1 SFD symbol, 1 CES symbol During the beacon period, beacons with quasi-omni patterns, i.e. patterns that cover a broad area of the region of space of interest, referred to as "Q-omni" beacons, are first transmitted. Directional beacons—that is, beacons transmitted using some antenna gain in some direction(s) may additionally be transmitted during the beacon period or in the CTAP between two devices.

A unique preamble sequence set may be assigned to each piconet within the same frequency channel, such as to improve frequency and spatial reuse. In one aspect of the disclosure, four preamble sequence sets (labeled by parameter m) are provided for frequency/spatial reuse. A preamble sequence set comprises a length-512 base sequence $s_{512,m}$ and two length-512 CES sequences $u_{512,m}$ and $v_{512,m}$. The base sequence $s_{512,m}$ is the Kronecker product of a length-4 cover sequence, $c_{4,m}$ and a length-128 modified Golay sequence $u_{128,m}$:

$$s_{512,m}[n]=c_{4,m}[\mathrm{floor}(n/128)]\times u_{128,m}[n \bmod 128]n=0{:}511$$

The base sequences $s_{512,m}$ occupy four non-overlapping frequency-bin sets, and therefore, are orthogonal in both time and frequency. The $m^{th}$ base sequence occupies frequency bins m, m+4, m+8, m+12, . . . . In one aspect of the disclosure, modified Golay sequences are generated from other Golay sequences, such as regular Golay complementary sequences, using time- or frequency-domain filtering to ensure that only the used subcarriers are populated rather than the entire 512 subcarriers.

The term "regular Golay complementary sequences," as used herein, and denoted by a and b, may be generated using the following parameters:

1. A delay vector D of length M with distinct elements from the set 2 m with m=0:M−1; and
2. A seed vector W of length M with elements from the QPSK constellation (±1, ±j).

Figure 5:
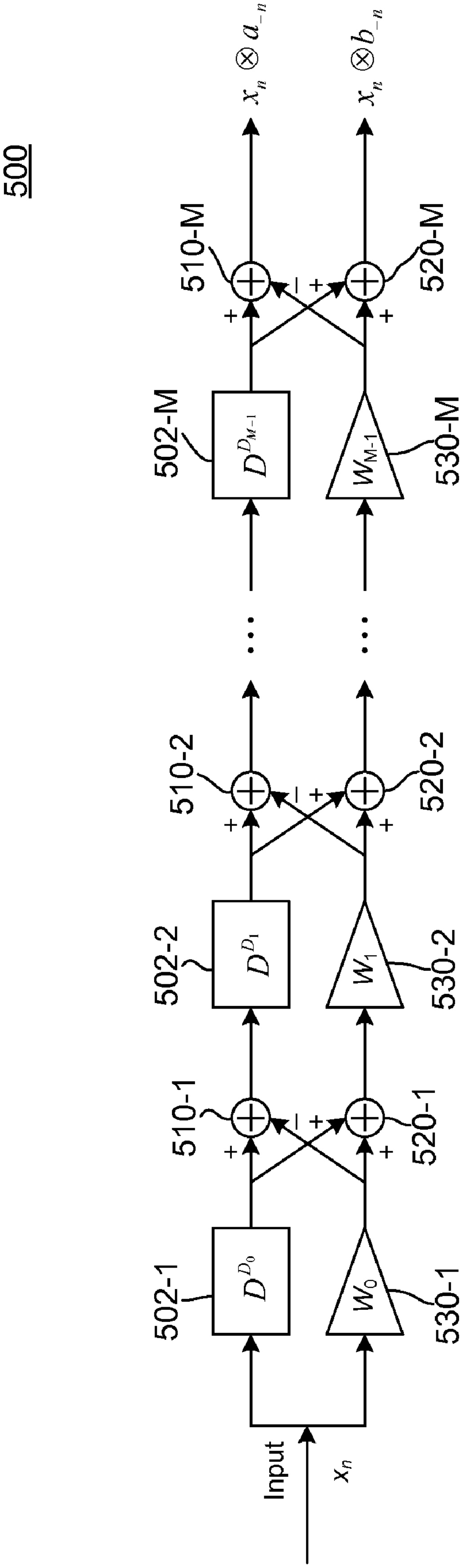
FIG. 5 is a block diagram of a Golay-code circuitry configured in accordance with one aspect of the disclosure.

FIG. 5 illustrates a Golay-code circuitry 500 that may be employed either as a Golay code generator or a matched filter in some aspects of the disclosure. The Golay-code circuitry 500 includes a sequence of delay elements 502-1 to 502-M configured for providing a determined set of fixed delays D=[D(0), D(1), . . . , D(M−1)] to a first input signal. The delay profile provided by the delay elements 502-1 to 502-M may be fixed, even when the Golay-code circuitry 500 is configured to produce multiple Golay complementary code pairs. The Golay-code circuitry 500 also includes a sequence of adaptable seed vector insertion elements 530-1 to 530-M configured for multiplying a second input signal by at least one of a plurality of different seed vectors $W^i$=[W(0), W(1), . . . , W(M−1)] to generate a plurality of seed signals. The output from each of the sequence of adaptable seed vector insertion elements 530-1 to 530-M is fed into a first set of combiners 510-1 to 510-M to be combined with a respective output of each of the delay elements 502-1 to 502-M. In the implementation of the Golay-code circuitry 500 as shown in FIG. 5, the output of each seed vector insertion element 530-1 to 530-M is added to the output of its respective delay elements 502-1 to 502-M by a respective one of the first set of combiners 510-1 to 510-M before the results then being fed to the next stage. A second set of combiners 520-1 to 520-M is configured for combining the delayed signals from the delay elements 502-1 to 502-M with signals multiplied by the seed vector, where the seed signals are subtracted from the delay signals in the Golay-code circuitry 500.

Receivers implemented in accordance with certain aspects of the disclosure may employ similar Golay-code generators to perform matched filtering of received signals so as to provide for such functionality as packet or frame detection.

In one aspect, Golay codes (a1, a2, a3, and a4) may be generated by combinations of Delay vectors (D1, D2, D3, and D3) and corresponding seed vectors (W1, W2, W3, and W4), as shown in the following table:

| a or b | Delay and Seed Vectors for Golay sequences a1, a2, a3 & a4 | | | | | | | |
|---|---|---|---|---|---|---|---|---|
| 0 | D1 | 64 | 32 | 8 | 1 | 4 | 2 | 16 |
| 0 | D2 | 64 | 32 | 8 | 1 | 4 | 2 | 16 |
| 1 | D3 | 64 | 32 | 4 | 2 | 8 | 1 | 16 |
| 0 | D4 | 64 | 32 | 4 | 2 | 8 | 1 | 16 |
| | W1 | −1 | −j | −1 | −j | −1 | 1 | 1 |
| | W2 | −1 | −1 | 1 | +j | 1 | −j | 1 |
| | W3 | −1 | −1 | −1 | −1 | 1 | +j | 1 |
| | W4 | −1 | −1 | 1 | −1 | 1 | −j | 1 |

The first, second, and fourth sequences are type a, whereas the third sequence is type b. Preferred sequences are optimized to have minimum sidelobe levels as well as minimum cross-correlation.

In some aspects of the disclosure, a base rate may be employed for OFDM signaling operations used for exchanging control frames and command frames, associating to a piconet, beamforming, and other control functions. The base rate is employed for achieving optimal range. In one aspect, 336 data subcarriers per symbol may be employed with frequency-domain spreading to achieve the base data rate. The 336 subcarriers (subcarriers −176 to 176) may be divided into 4 non-overlapping frequency bins, such as described with respect to the preamble, and each set may assigned to one of a plurality of PNCs operating in the same frequency band. For example, a first PNC may be allocated subcarriers −176, −172, −168, . . . , 176. A second PNC may be allocated subcarriers −175, −171, −167, . . . , 173, and so on. Furthermore, each PNC may be configured for scrambling the data to distribute it over multiple subcarriers.

In IEEE 802.15.3, piconet timing is based on a super frame including a beacon period during which a PNC transmits beacon frames, a Contention Access Period (CAP) based on the CSMA/CA protocol, and a Channel Time Allocation Period (CTAP), which is used for Management (MCTA) and regular CTAs, as further explained below During the beacon period, beacons with almost omnidirectional antenna patterns, referred to as quasi-omni, or "Q-omni" beacons, are first transmitted. Directional beacons—that is, beacons transmitted using some antenna gain in some direction(s) may additionally be transmitted during the beacon period or in the CTAP between two devices.

In order to reduce overhead when transmitting directional beacons, the preamble may be shortened (e.g., the number of repetitions may be reduced) for higher antenna gains. For example, when an antenna gain of 0-3 dB is provided, the beacons are transmitted using a default preamble comprising eight modified Golay codes of length 512 and two CES symbols. For an antenna gain of 3-6 dB, the beacons employ a shortened preamble of four repetitions of same modified Golay code and two CES symbols. For an antenna gain of 6-9 dB, the beacons transmit a shortened preamble of two repetitions of the same modified Golay code and 1 or 2 CES symbols. For antenna gains of 9 dB or more, the beacon preamble employs only one repetition of the same Golay code and 1 CES symbol. If a header/beacon is used during beaconing or for data packets, the header-data spreading factor may be matched to the antenna gain.

Various aspects of the disclosure provide for a unified messaging protocol that supports a wide range of antenna configurations, beamforming operations, and usage models. For example, antenna configurations may include omnidirectional or quasi-omni antennas, directional antenna patterns of a single antenna, diversity-switched antennas, sectored antennas, beamforming antennas, as well as other antenna configurations. Beamforming operations may include proactive beamforming, which is performed between a PNC and a device, and on-demand beamforming, which is performed between two devices. Different usage models for both proactive beamforming and on-demand beamforming include per-packet beamforming from a PNC to multiple devices and from at least one device to the PNC, transmissions from a PNC to only one device, communications between devices, as well as other usage models. Proactive beamforming is useful when the PNC is the data source for multiple devices, and the PNC is configured for transmitting packets in different physical directions, each of which corresponding to a location of one or more devices for which packets are destined.

In some aspects, the unified (SC/OFDM) messaging protocol is independent of the beamforming algorithm and antenna configuration used in the devices in wireless network 1400. This allows for flexibility in the actual beamforming algorithms employed. However, the tools enabling the beamforming should be defined. These tools should support all scenarios while enabling reduced latency, reduced overhead, and fast beamforming.

The following table shows four types of single-carrier beamforming packets that may be employed by aspects of the disclosure.

| Packet Type | Preamble Length (# 128 chips) | Header Rate (Mbps) | Data Rate (Mbps) | Requirement (M)andatory/ (O)ptional |
|---|---|---|---|---|
| I | 36 | 50 | 50 | M |
| II | 20 | 100 | 100 | O |
| III | 12 | 200 | 200 | O |
| IV | 8 | 400 | 400 | O |

Since these are single-carrier packets transmitted using the common mode, they can be decoded by both single-carrier and OFDM devices. The majority of transmitted packets may have no body—just a preamble.

The different types of packets may be employed for different antenna gains in such a way as to substantially equalize the total gain of the transmissions, taking into consideration both coding gain and antenna gain. For example, a Q-Omni transmission with 0~3 dB antenna gain may employ type I packets. A directional transmission with 3~6 dB antenna gain may use type II packets. A directional transmission with 6~9 dB antenna gain may use type III packets, and a directional transmission with 9~12 dB antenna gain may uses type IV packets.

Figure 6:
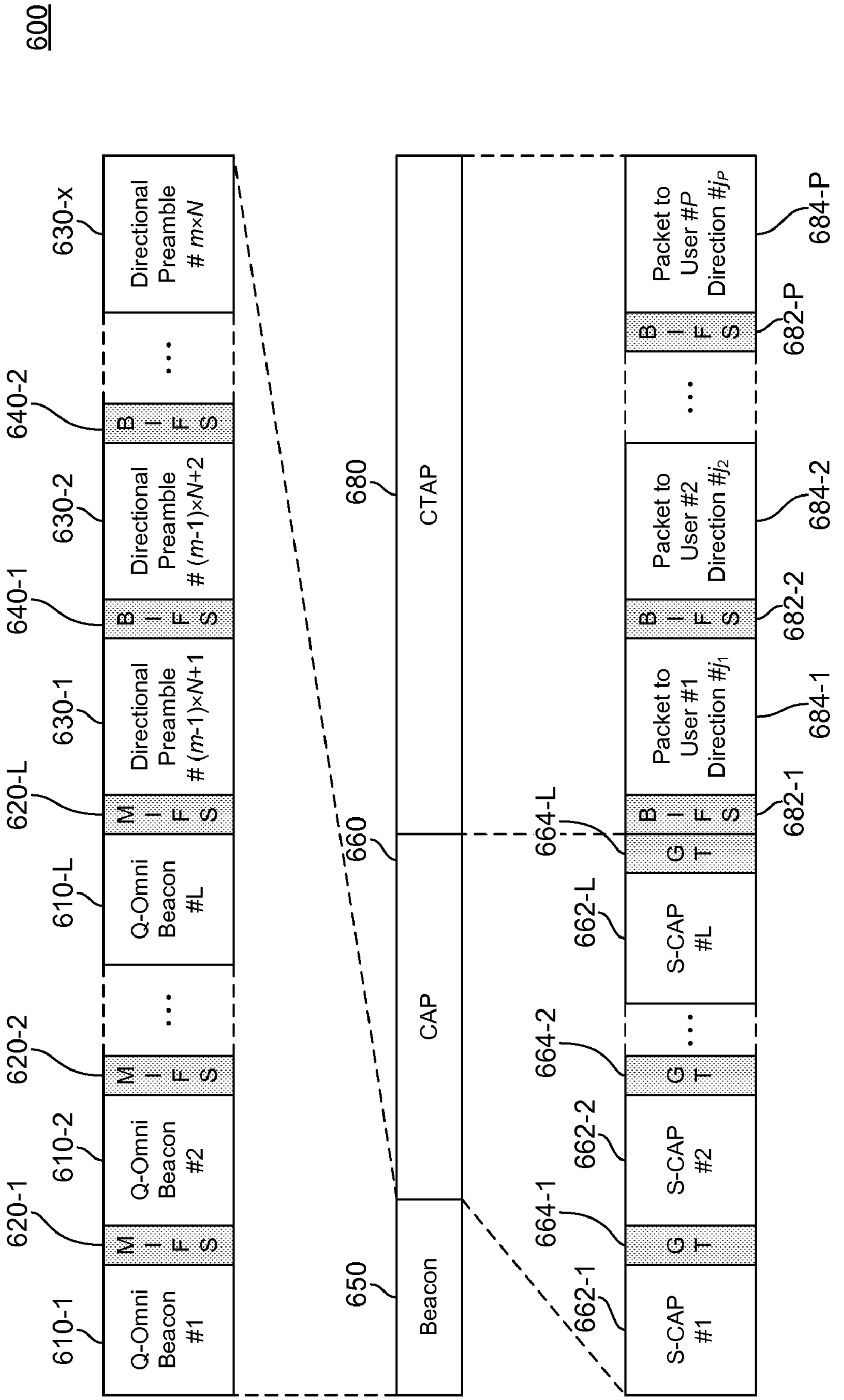
FIG. 6 is a structure diagram of a superframe structure for use in proactive beamforming as configured in accordance with one aspect of the disclosure.

FIG. 6 illustrates a superframe structure 600 that may be employed by various aspects of the disclosure to perform proactive beamforming. The multipath channel environment between the PNC and a device is assumed to be reciprocal, i.e. the channel from the PNC to the device is the same as the channel from the device to the PNC. The superframe structure 600 includes a beacon portion 650, a Contention Access Period (CAP) 660 based on the CSMA/CA protocol, and Channel Time Allocation Period (CTAP) 680, which is used for Management (MCTA) and regular CTAs. The beacon portion 650 includes a Q-omni section and a directional section. The Q-omni section includes L transmissions in the superframe structure 600, which is a plurality of Q-Omni beacons, as represented by Q-Omni beacons 610-1 to 610-L, each of which is separated by a respective MIFS (Minimum InterFrame Spacing which is a guard time), as represented by a plurality of MIFS 620-1 to 620-L.

The CAP 660 is divided into a plurality of sub-CAPs (S-CAPs), which is represented by S-CAPs 662-1 to 662-L, each followed by a respective Guard Time (GT), which is represented by GTs 664-1 to 664-L. The directional section 630-1 to 630-x contains a plurality of directional preambles.

Figure 7:
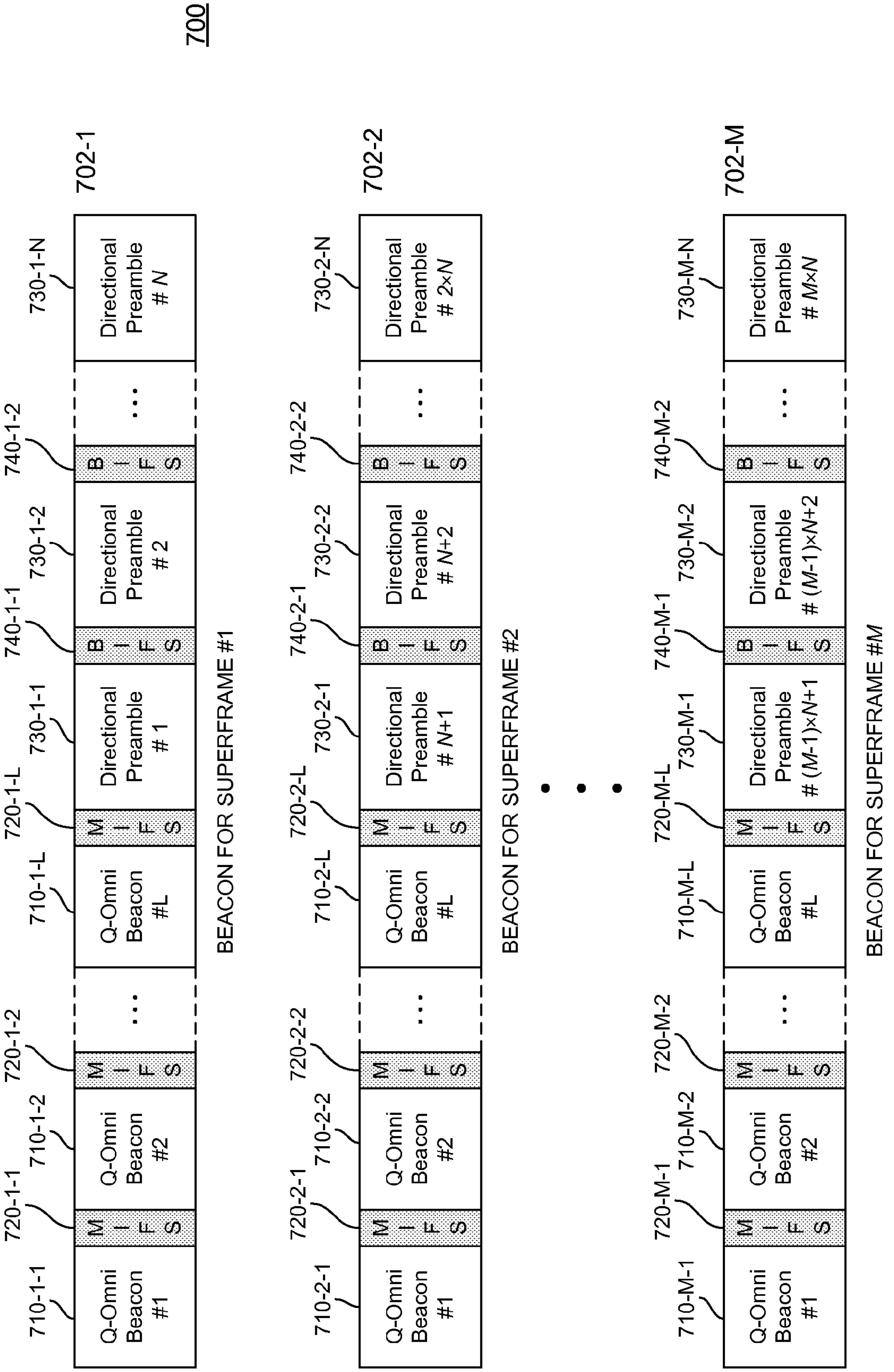
FIG. 7 is a structure diagram of a plurality of beacon structures to be used in a respective plurality of superframe structures similar to the superframe structure of FIG. 6.

In FIG. 7, the first L transmissions in a superframe structure 700, similar to the superframe structure 600 of FIG. 6, use Q-Omni beacons that, together, provide an omnidirectional pattern of beacon transmission. For a PNC capable of omnidirectional coverage—that is, a PNC having an omnidirectional-type antenna, L=1. For a PNC with sectorized antennas, L would represent the number of sectors that the PNC is able to support. Similarly, when a PNC is provided with switching transmit diversity antennas, L would represent the number of transmit antennas in the PNC.

Further, in the aspect of the disclosure shown in FIG. 7, the PNC is configured to beamform in J=N×M directions. Specifically, the PNC is able to send directional beacons in a determined number of directions as part of the beamforming process. In one aspect, each directional beacon consists only of a preamble and no header nor data. These directional beacons are referred to as directional preambles. The PNC is able to send directional preambles in J directions, as represented by directional preambles 730-1-1 to 730-1-N for superframe beacon #1 702-1 through directional preambles 730-M-1 to 730-M-N for superframe beacon #M 702-M, wherein a direction may include one or more beams. The directional preamble are distributed over M superframes, as illustrated by superframes 702-1 to 702-M, with N directional preamble per superframe, and the structure is periodic with a period of M superframes.

The CAP is divided into L sub-CAP periods corresponding to the L Q-Omni beacons. During the $l^{th}$ S-CAP, the PNC antenna transmits in the same direction it used to transmit the $l^{th}$ Q-Omni beacon. This case assumes that the channel is reciprocal.

The first L beacons may be of any packet type. In one aspect, omnidirectional beacons use type I packets with a long preamble; Q-Omni beacons sent with sectored antennas or antenna arrays with 3-6 dB gain use type I or type II packets; and Q-Omni beacons using sectored antennas or antenna arrays with 6-9 dB gain may use type I, type II, or type III packets. In one aspect, the packet type used is communicated to other devices in the SFD. Thus, upon a successful detection of the SFD, a device will have knowledge of the header and data rates for the subsequent portion of the packet and can use that knowledge to successfully decode the packet.

Each Q-Omni beacon may carry a beamforming information element 840, such as shown in FIG. 8A to convey the structure of the beamforming beacons to all devices listening to the PNC. Once a device decodes any one of the Q-omni beacons during any superframe, it is capable of understanding the entire beamforming cycle. In one aspect, the beamforming information element 840 includes a directional packet type field 842 (e.g., type I, II, III or IV), a current directional beacon identifier (ID) field 844, a number of superframes per beamforming cycle (e.g., the value M from the frame structure 700 of FIG. 7) field 846, a number of directional preambles per superframe (e.g., the value N from the frame structure 700 of FIG. 7) field 848, a current Q-omni beacon ID field 850, a number of Q-omni beacons (e.g., the value L from the frame structure 700 of FIG. 7) field 852, a length field 854 containing the number of octets in the information element, and an element ID field 856, which is the identifier of the information element. The current Q-omni beacon ID field 850 contains a number identifying the number/position of the current Q-omni beacon being transmitted in the current superframe with respect to the number of Q-omni beacons field 852 in the superframe. A device, using the number contained in the current Q-omni beacon ID field 850, will know which Q-omni direction from which it heard the beacon.

FIG. 8B illustrates a superframe information element 860 that is transmitted with the beamforming information element 840, and includes a PNC address field 862, a PNC response field 864, a piconet mode 866, a maximum transmission power level 868, a S-CAP duration field 870, a number of S-CAP periods field 872, a CAP end time field 874, a superframe duration field 876, and a time token 878.

Figure 9A:
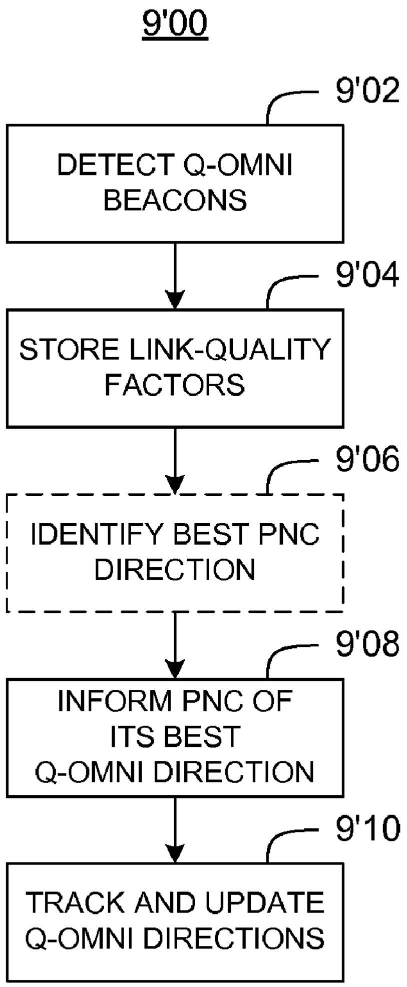
FIGS. 9A and 9B are flow charts of a device with an omnidirectional receive antenna and a single directional antenna device, respectively, configured in accordance with various aspects of the disclosure.
Figure 9B:
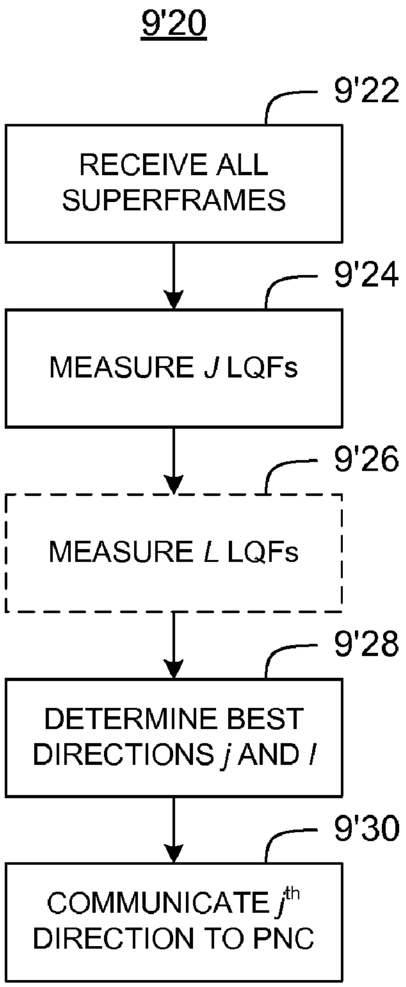

FIGS. 9A and 9B illustrate two approaches for a beamforming operation by devices in accordance with various aspect of the disclosure. FIG. 9A is directed to a beamforming process 900 of a device with omnidirectional receive capabilities. In step 902 the omnidirectional device only need to detect the Q-omni beacons of one superframe. If the device is not omnidirectional, the device needs to sweep over all its received directions by listening to one superframe for each receive direction for example in order to detect the beacon. Upon detection of the Q-omni beacons, the device stores a Link-Quality Factor (LQF) in step 904 for each of the Q-omni beacons. Then, in step 906, the device sorts the L LQFs, [LQF(1), . . . , LQF(L)], and identifies the best PNC direction l corresponding to the highest LQF:

$l=\arg\{\max[LQF(i)]\}$ $i=1:L$

In step 908, the device associates itself with the PNC during the $l^{th}$ CAP of the current superframe, and instep 910 informs the PNC that all further communications should occur with the PNC using its $l^{th}$ Q-omni direction. The device may still track the set of L best directions by monitoring the corresponding S-omni beacons every Q superframes. If a direction (e.g., the $r^{th}$ S-omni direction) is found with a better LQF, the device may inform the PNC to transmit the next packet using the $r^{th}$ S-omni direction by encoding it in the "NEXT DIRECTION" field in the PHY header.

FIG. 9B illustrates a beamforming process 920 performed by a device with a single directional antenna in accordance with an aspect of the disclosure. In step 922, the device may receive an entire cycle of M superframes and when the device detects one of the Q-Omni beacons, it will learn that it is receiving the $m^{th}$ superframe, and will listen to superframes m, m+1, . . . , m+M−1.

During the cycle of M superframes, the device measures, stores, and sorts J LQFs in step 924 corresponding to the J directional PNC directions. During the same cycle, the device measures the L LQFs corresponding to the L S-omni PNC directions in step 926. Then, in step 928, the device determines the best directional direction, j, and the best Q-omni direction, l. The device associates with the PNC during the $l^{th}$ CAP of the $(m+M-1)^{th}$ superframe and informs the PNC in step 930 that all further communications should occur with the PNC using its $j^{th}$ directional direction. Optionally, the device may continue to track the set of J directions by monitoring the corresponding directional beacons every Q×M superframes. If a direction r is found with a better LQF, the device may direct the PNC to update its directional beam pattern to the device by encoding direction r in the "NEXT DIRECTION" field in the PHY header.

Figure 10A:
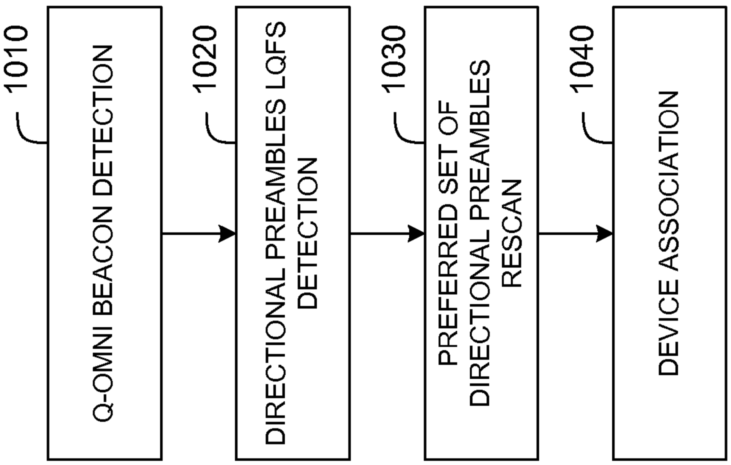
FIGS. 10A-10E are flow charts of a beamforming acquisition process for a device configured in accordance with an aspect of the invention.

FIG. 10A illustrates an overview of a beamforming process 1000 in accordance with an aspect of the disclosure that may be performed with a directional device capable of transmitting and receiving in at least one Q-omni direction and I directional directions. In step 1010, the device will perform Q-omni beacon detection. Once a beacon has been detected, the device will perform detection for directional preambles and the LQFs therefor in step 1020. In step 1030, the device can optionally rescan for a preferred set of directional preambles. The rescan will allow the device to verify that the selected Q-omni directions are preferred. Lastly, in step 1040, the device will associate itself with the PNC based on the preferred LQF.

Figure 10B:
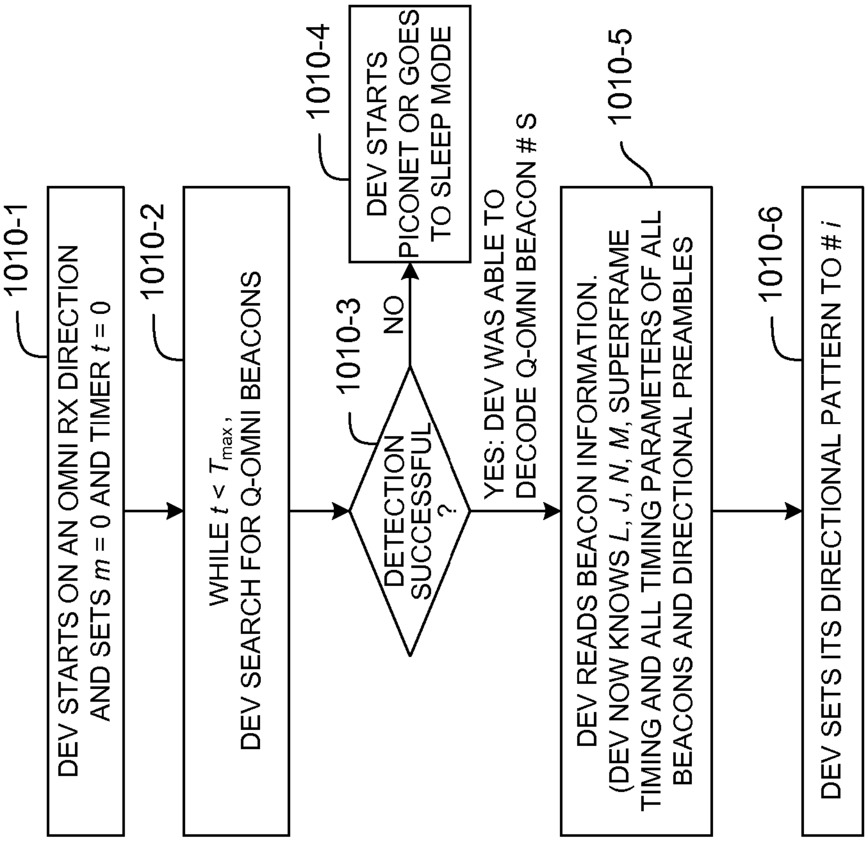

FIG. 10B details the beacon detection process 1010 where, starting with step 1010-1, the device sets a timeout and begins to search for a beacon in one of Q-omni directions. The device will search for a Q-omni beacon as long as the time has not expired in step 1010-2. If the detection is successful, as determined in step 1010-3, then the device will read the beacon information and obtain all timing parameters of the Q-omni transmission as well as the superframe. If the device starts listening during the $m^{th}$ superframe, then upon detection of a Q-omni beacon (e.g., Q-omni beacon number l), it discovers that it is listening during the $m^{th}$ superframe. The device can set its directional pattern to the direction of the beacon. If the device does not detect a Q-omni beacon, then operation continues with step 1010-4, where the device can start its own piconet or, in the alternative, go to sleep mode.

Figure 10D:
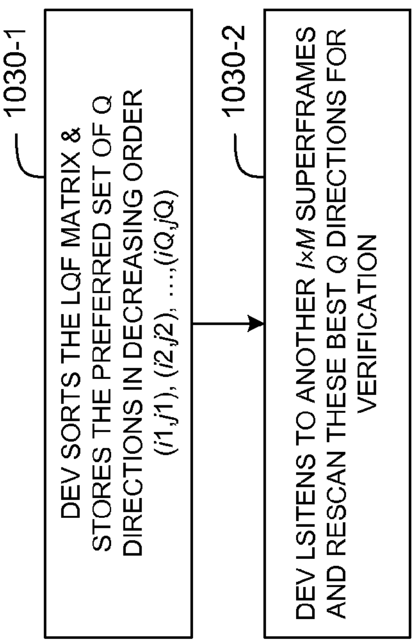
Figure 10C:
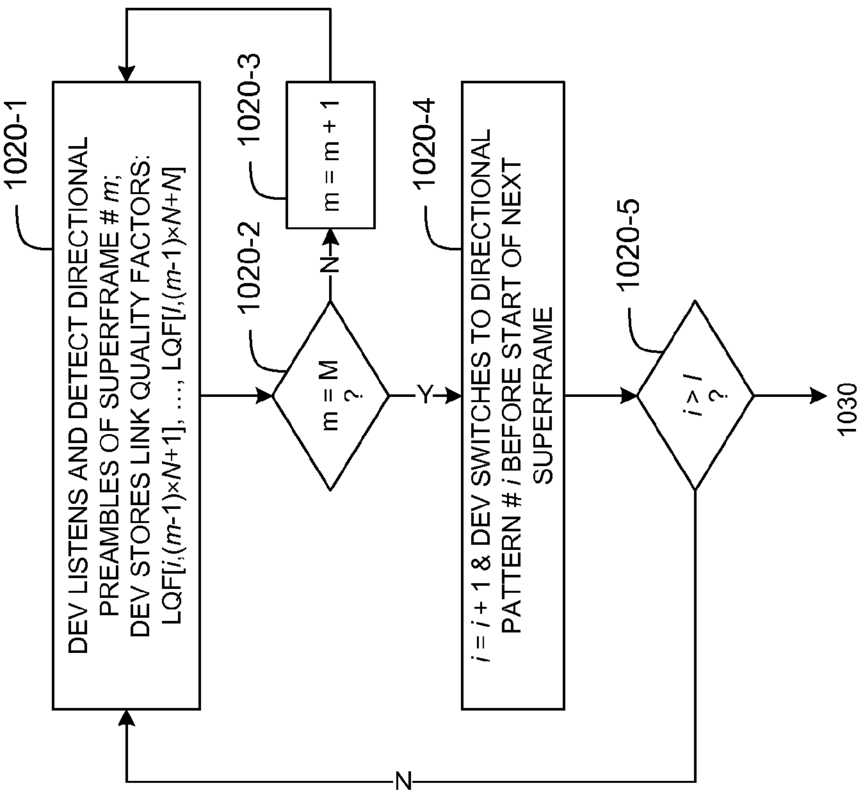

FIG. 10C details the directional preamble acquisition and LQF determination process 1020 where, in one aspect, as detailed in steps 1020-1 to 1020-5, the device may listen to I×J superframes, J superframes for each of its I directions as follows. The device sets its directional direction to number l, listens to M superframes (m, m+1, . . . , m+M−1), as shown in steps 1020-2, 1020-3 and 1020-1 and stores the corresponding J LQFs, LQF(1,1) . . . LQF(1,J), wherein the first index refers to the device's direction, whereas the second index refers to the PNC's direction. In step 1020-3, the device sets its directional direction to number 2, listens to the next superframe, and stores the J LQFs: LQF(2,1) . . . LQF(2,J) in step 1020-1. These step are repeated a determined number of (e.g., M) times. Upon the last iteration, the device sets its directional direction to number 1, listens to the next M superframes, and stores the J LQFs: LQF(I,1) . . . LQF(I,J).

FIG. 10D details the best directional determination process 1030, where, in step 1030-1, the device finds the best directional combination (i,j) referring to the device using its $i^{th}$ directional direction and the PNC using it $j^{th}$ directional direction. sorts the corresponding J LQFs, LQF(1,1) . . . LQF(1,J), In step 1030-2, the device can also listen to another I×M superframes for verification of the best directional direction.

Figure 10E:
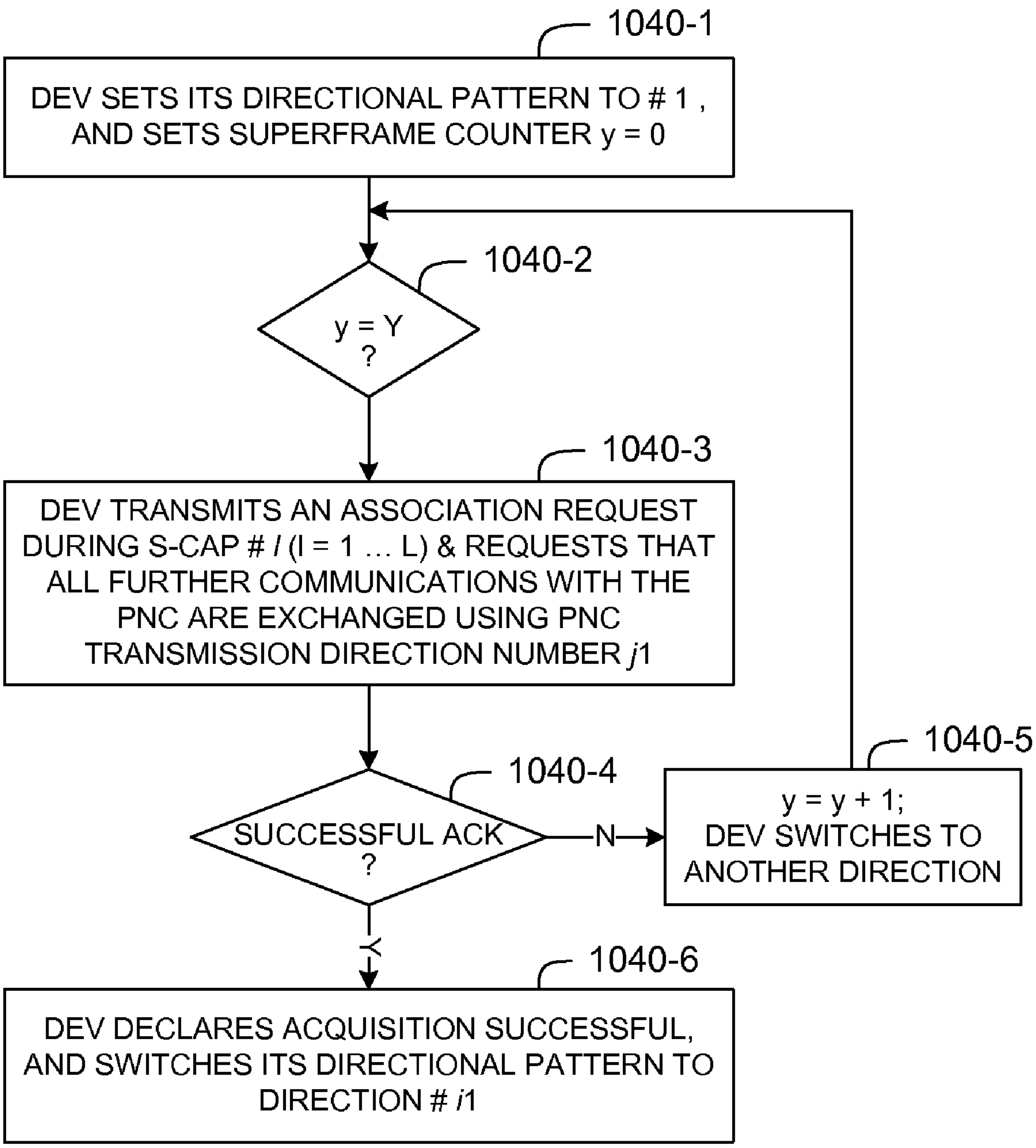

FIG. 10E details the device association process 1040 with the PNC where, in step 1040-1, the device sets its directional pattern to #1 and resets the superframe counter to zero. Then, in steps 1040-2 to 1040-5, the device will attempt to associate with the base station and pass the PNC the preferred direction information. In one aspect, the device sends the information to the PNC during the $l^{th}$ S-CAP period and informs the PNC of the best direction at this time. If the association is successful in step 1040-4, then operation continues to step 10-6, where the device declares a successful acquisition and switches its directional pattern to the best direction.

In another aspect of the disclosure, the device can also perform an iterative process set its directional direction to number l and listens to the N directional beacons during the current superframe. If a direction j corresponding to the PNC's directional direction having an adequate LQF is found, then the device will associate to the PNC during the $l^{th}$ S-CAP period and inform the PNC to use its $j^{th}$ direction for data communication. The device may still choose to scan for better directions, and if one is found, it informs the PNC to switch to the new direction by encoding the field "NEXT DIRECTION" in the PHY header. If no adequate direction is found, the device switches to another direction (e.g., direction r) that is orthogonal to direction l and listens to the next superframe. This process may be repeated until an adequate direction is found.

On-demand beamforming may be performed between two devices, or between a PNC and one device. In one aspect of the disclosure, on-demand beamforming is conducted in the CTA allocated to the link between two devices. When a device is communicating with multiple devices, the same messaging protocol as the proactive beamforming messaging protocol is used. In this case, the CTA will play the role of the beacon period during the beamforming phase, and will be used for data communication thereafter. In the case where only two devices are communicating, since the CTA is a direct link between them, it is possible to employ a more collaborative and interactive on-demand beamforming messaging protocol.

Figure 11A:
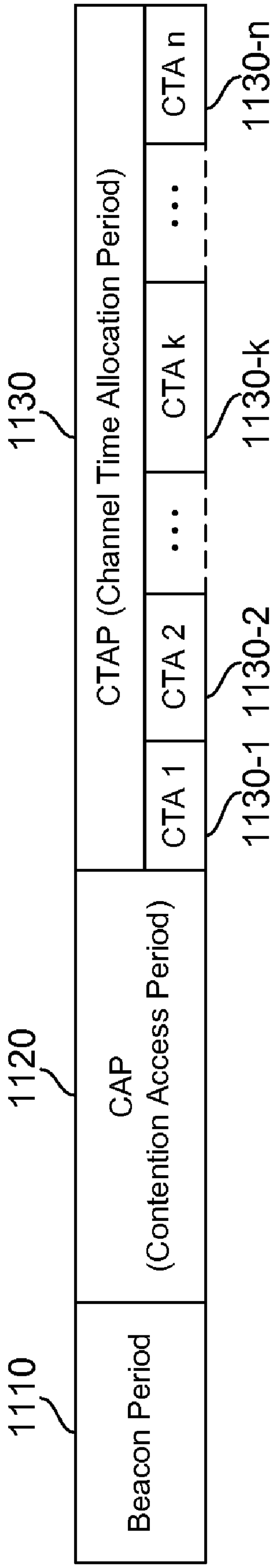
FIGS. 11A and 11B relate to a process for on-demand beamforming configured in accordance with an aspect of the disclosure.
Figure 11B:
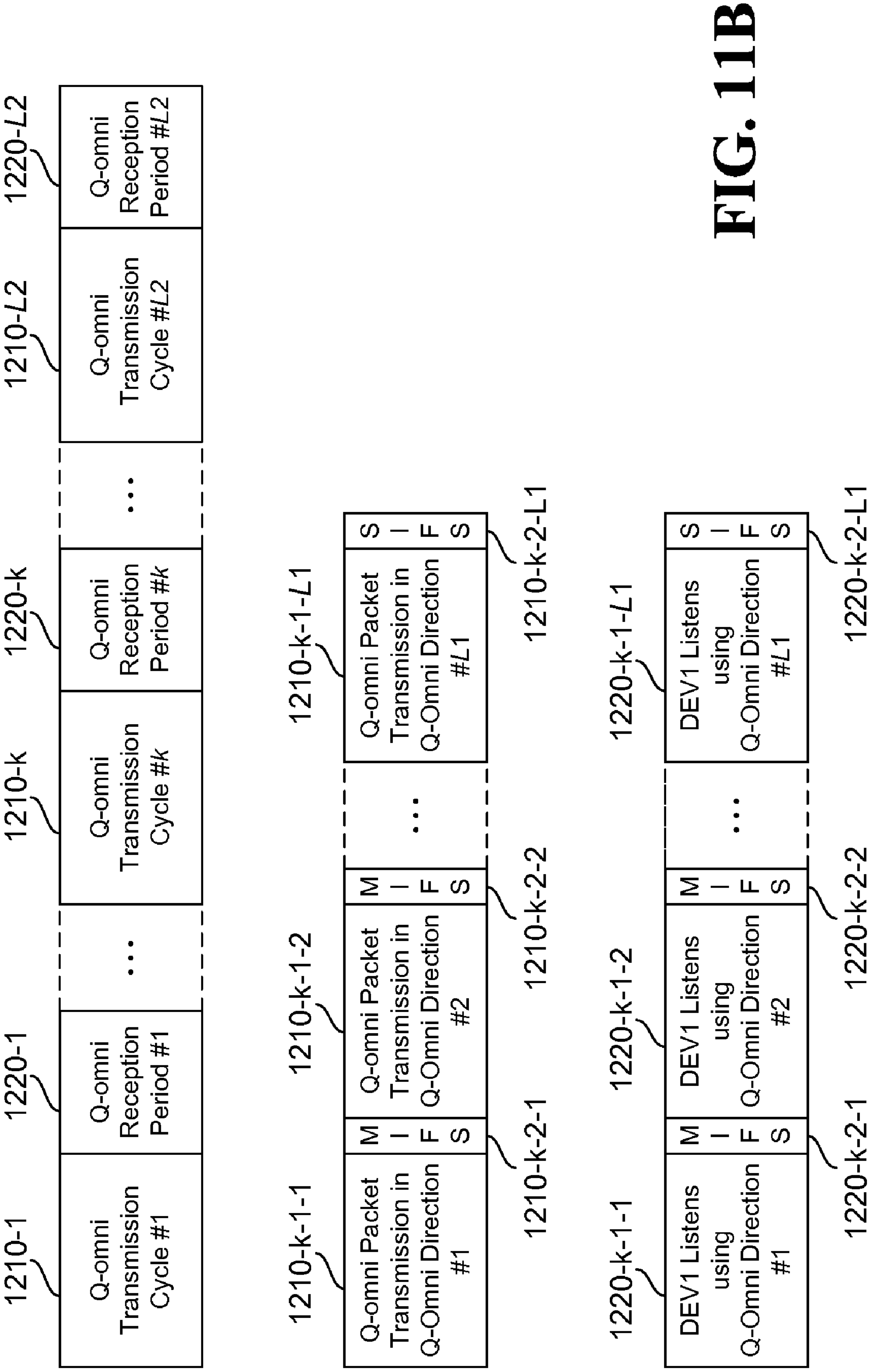

In a Q-omni phase, a first device begins its first transmission with L1 Q-omni packets followed by L1 corresponding Q-omni listening periods, such as illustrated in FIG. 11. The first device keeps repeating this section until a second device returns a response. Each Q-omni training packet contains the Q-omni training packet IE, such as shown in FIG. 12A. An Q-omni training response packet IE is shown in FIG. 12B.

The second device, which is capable of L2 Q-omni directions, sets its reception direction to one of the L2 directions and listens to device 1's first L1 transmissions and stores L1 LQFs. Device 2 moves to a new direction and listens to device 1's second period of L1 transmissions. This process may be repeated until an adequate LQF is found. Alternatively, device 2 may choose to listen using all L2 directions, and then find the best LQF. At the end of this phase, both devices know the best combination of Q-Omni directions to use for exchanging data.

Device 2 may use the Q-Omni training response packet IE to inform device 1 of its Q-omni capabilities (i.e. L2, as well as its own best first direction and second direction that it will use for all messaging). Furthermore, device 2 may inform device 1 of the best first and second directions it discovered from the L1 direction. Device 1's best Q-omni direction would be labeled l1, and device 2's best Q-omni-direction would be labeled l2. Similarly, device 2 may inform device 1 of its directional capability.

Figure 13A:
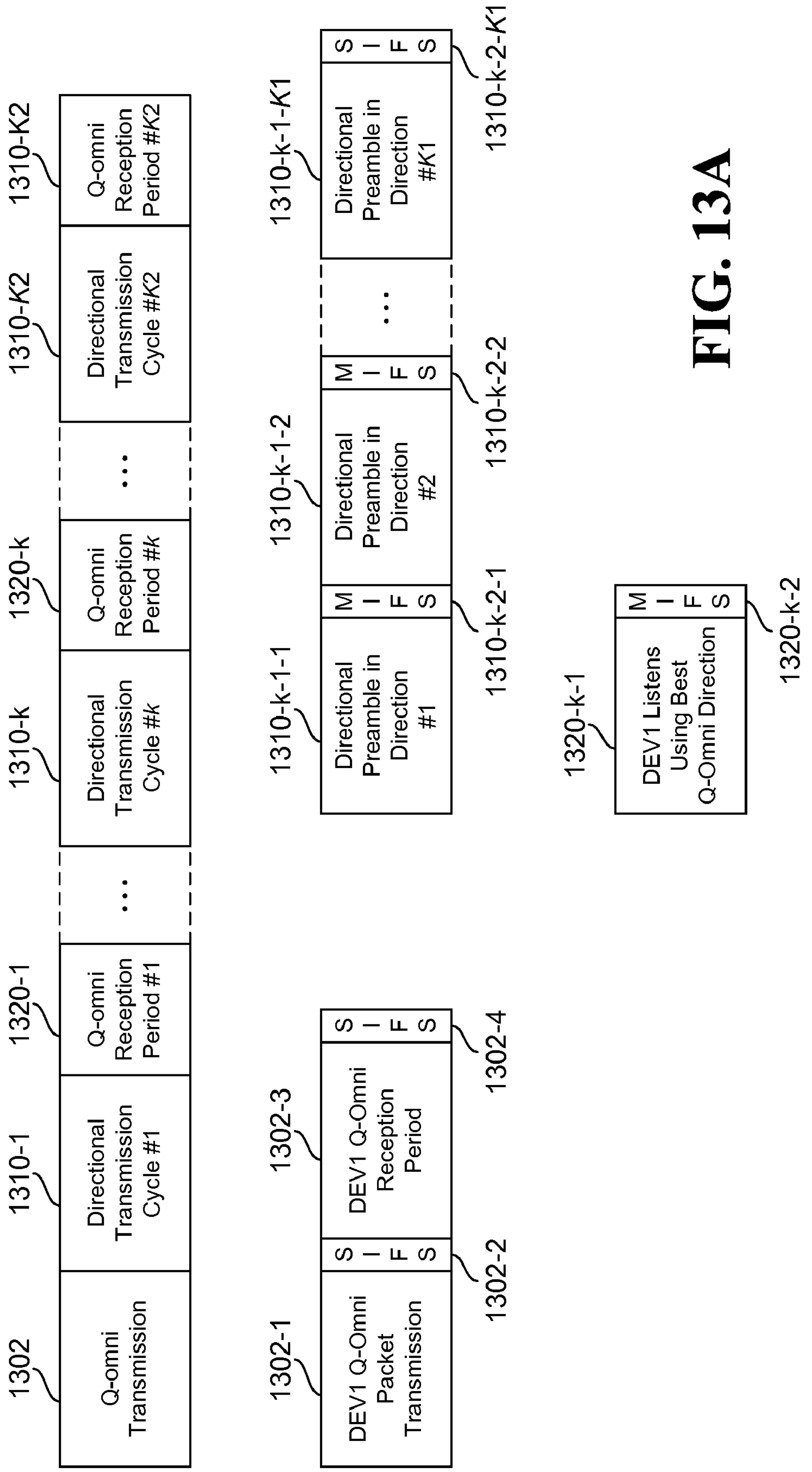

FIGS. 13A-13C relate to a directional phase of on-demand beamforming. The first device uses R cycles to perform beamforming. The R cycles may occur within one CTA, or may be distributed over M superframes. Each cycle comprises K sub-cycles, where N and K can change from one cycle to another. This will allow for different search algorithms, such as random and binary search. This also helps differentiate between acquisition and tracking. Each cycle is preceded by a Q-omni transmission outlining the structure of the current cycle. Each sub-cycle includes N directional preambles followed by a Q-omni listening period. FIG. 13B shows an IE transmitted in the Q-omni beacon, and the form of the response is illustrate in FIG. 13C.

Figure 14:
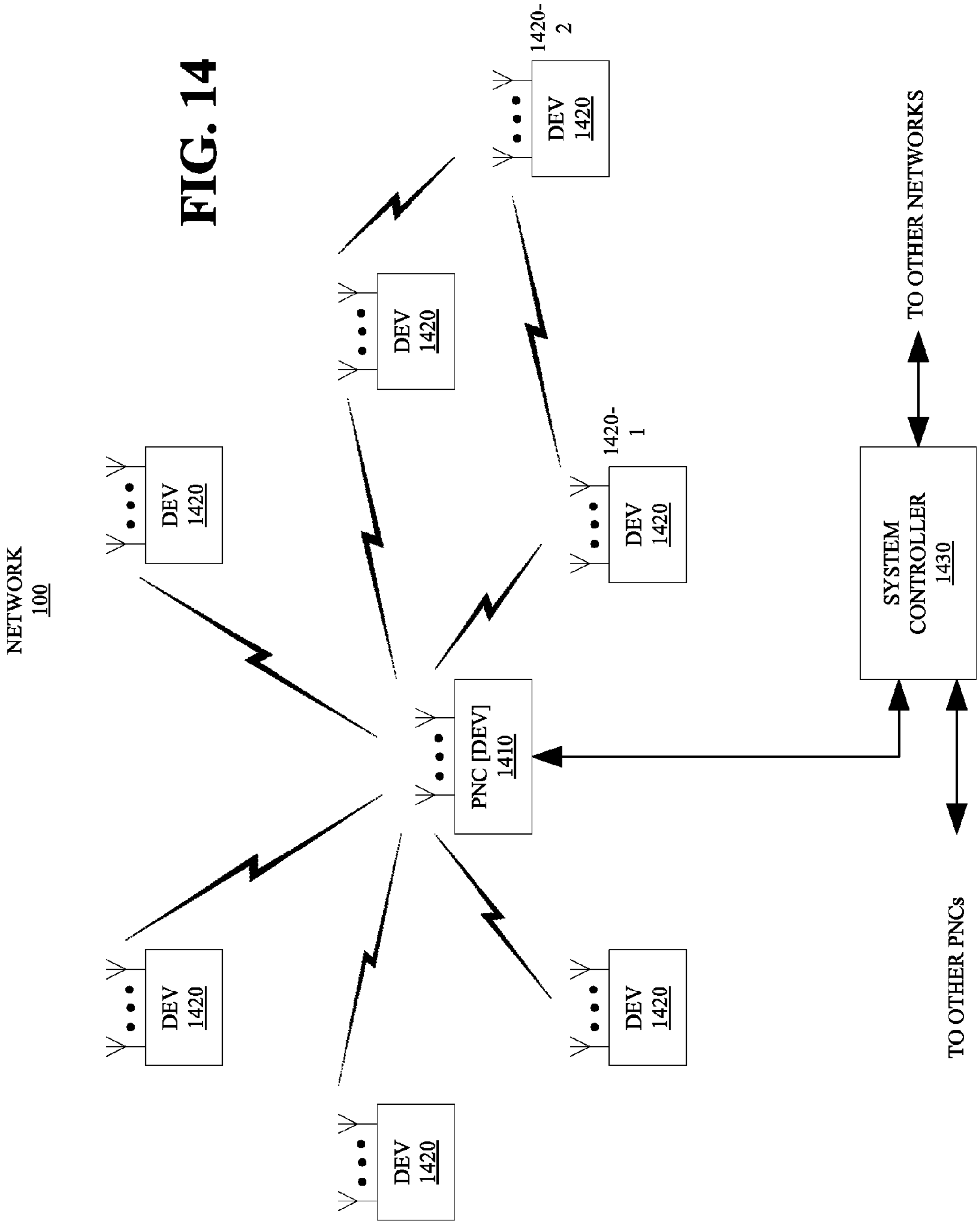
FIG. 14 is a diagram of a wireless network configured in accordance with an aspect of the disclosure.

Several aspects of a wireless network 1400 will now be presented with reference to FIG. 14, which is a network formed in a manner that is compatible with the IEEE 802.15.3c Personal Area Networks (PAN) standard and herein referred to as a piconet. The network 1400 is a wireless ad hoc data communication system that allows a number of independent data devices such as a plurality of data devices (DEVs) 1420 to communicate with each other. Networks with functionality similar to the network 1400 are also referred to as a basic service set (BSS), or independent basic service (IBSS) if the communication is between a pair of devices.

Each DEV of the plurality of DEVs 1420 is a device that implements a MAC and PHY interface to the wireless medium of the network 1400. A device with functionality similar to the devices in the plurality of DEVs 1420 may be referred to as an access terminal, a user terminal, a mobile station, a subscriber station, a station, a wireless device, a terminal, a node, or some other suitable terminology. The various concepts described throughout this disclosure are intended to apply to all suitable wireless nodes regardless of their specific nomenclature.

Under IEEE 802.15.3c, one DEV will assume the role of a coordinator of the piconet. This coordinating DEV is referred to as a PicoNet Coordinator (PNC) and is illustrated in FIG. 14 as a PNC 1410. Thus, the PNC includes the same device functionality of the plurality of other devices, but provides coordination for the network. For example, the PNC 1410 provides services such as basic timing for the network 1400 using a beacon; and management of any Quality of Service (QoS) requirements, power-save modes, and network access control. A device with similar functionality as described for the PNC 1410 in other systems may be referred to as an access point, a base station, a base transceiver station, a station, a terminal, a node, an access terminal acting as an access point, or some other suitable terminology. The PNC 1410 coordinates the communication between the various devices in the network 1400 using a structure referred as a superframe. Each superframe is bounded based on time by beacon periods.

The PNC 1410 may also be coupled to a system controller 1430 to communicate with other networks or other PNCs.

Figure 15:
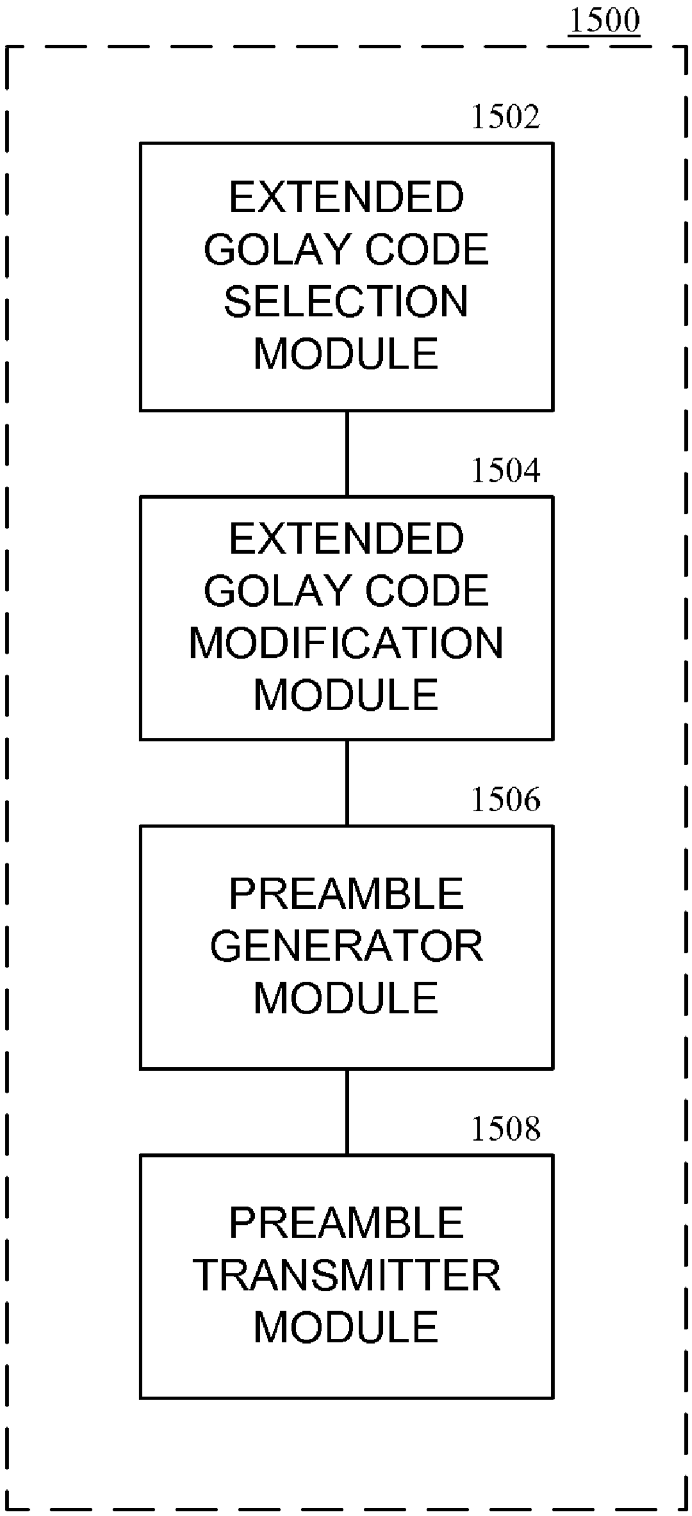
FIG. 15 is a block diagram of a preamble generation apparatus configured in accordance with an aspect of the disclosure.

FIG. 15 illustrates a preamble generation apparatus 1500 that may be used with various aspects of the disclosure, the preamble generation apparatus 1500 including an extended Golay code selection module 1502 for obtaining an extended Golay code selected from a set of extended Golay codes; an extended Golay code modification module 1504 that modifies the extended Golay code from the extended Golay code selection module 1502; and a preamble generator 1506 that generates a preamble using the modified extended Golay code from the extended Golay code modification module 1504. A preamble transmitter 1508 then transmits the preamble.

Figure 16:
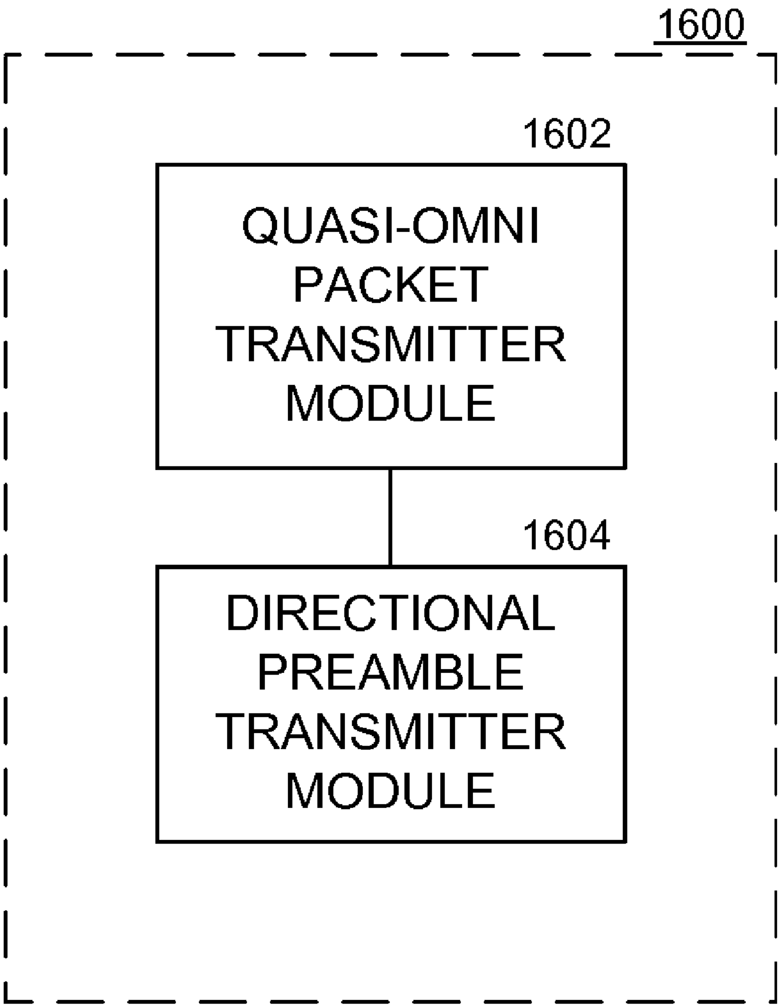
FIG. 16 is a block diagram of a quasi-omni packet and directional preamble transmitter apparatus configured in accordance with an aspect of the disclosure.

FIG. 16 illustrates a quasi-omni packet and directional preamble transmitter apparatus 1600 that may be used with various aspects of the disclosure, the quasi-omni packet and directional preamble transmitter apparatus 1600 including a quasi-omni packet transmitter module 1602 that transmits a plurality of quasi-omni packets, each quasi-omni packet being transmitted in a particular quasi-omni pattern; and, a directional preamble transmitter module 1604 that transmits a plurality of preambles from the first device, each preamble being transmitted in one of a plurality of directional patterns.

Figure 17:
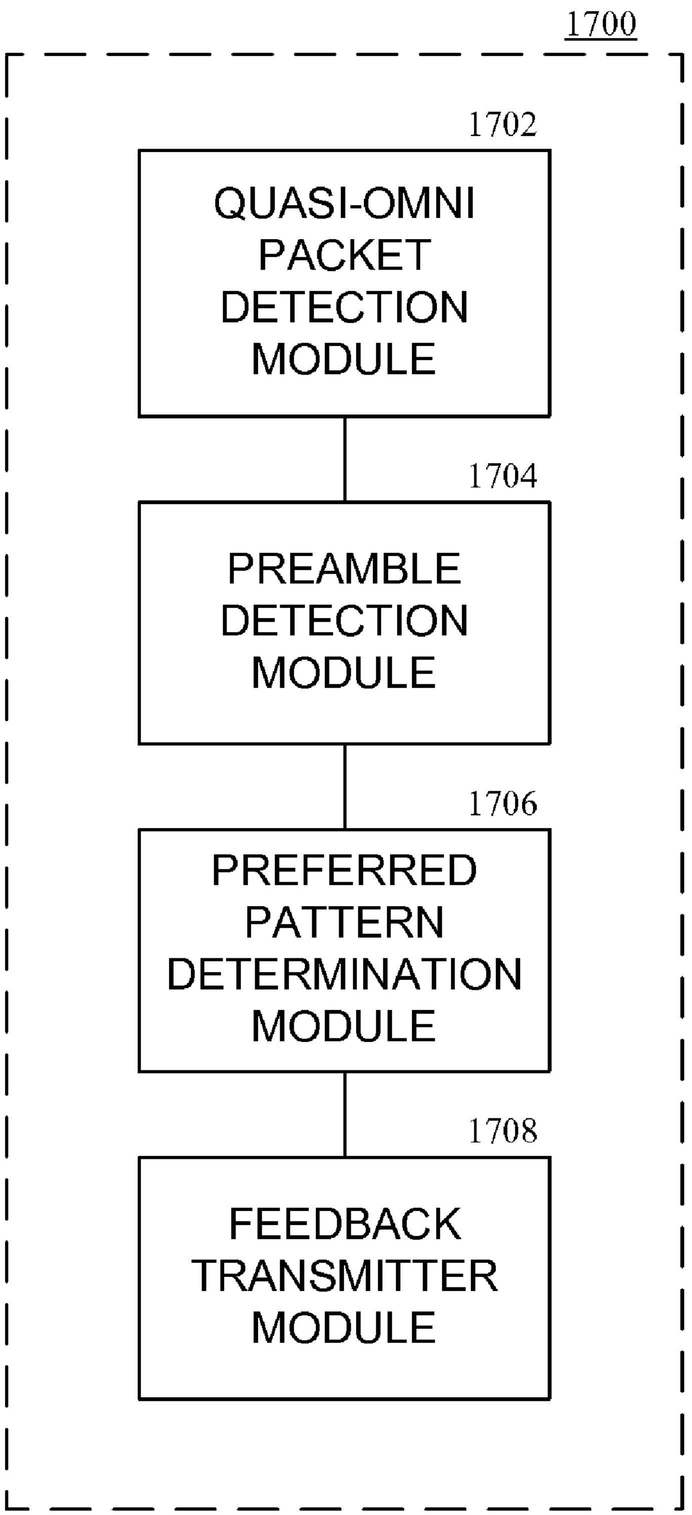
FIG. 17 is a block diagram of a beamforming feedback apparatus configured in accordance with an aspect of the disclosure.

FIG. 17 illustrates a beamforming feedback apparatus 1700 that may be used with various aspects of the disclosure, the beamforming feedback apparatus 1700 including a quasi-omni packet detection module 1702 that detects a quasi-omni packet of a plurality of quasi-omni packets transmitted in plurality of quasi-omni patterns from a first device; a preamble detection module 1704 that detects a preamble transmitted in a directional pattern from the first device; a preferred pattern determination module 1706 that determines a preferred pattern including at least one of a quasi-omni pattern and a directional pattern; and a feedback transmitter module 1708 that transmits a feedback to the first device including the preferred pattern.

Various aspects described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media may include, but are not limited to, magnetic storage devices, optical disks, digital versatile disk, smart cards, and flash memory devices.

The disclosure is not intended to be limited to the preferred aspects. Furthermore, those skilled in the art should recognize that the method and apparatus aspects described herein may be implemented in a variety of ways, including implementations in hardware, software, firmware, or various combinations thereof. Examples of such hardware may include ASICs, Field Programmable Gate Arrays, general-purpose processors, DSPs, and/or other circuitry. Software and/or firmware implementations of the disclosure may be implemented via any combination of programming languages, including Java, C, C++, Matlab™, Verilog, VHDL, and/or processor specific machine and assembly languages.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The method and system aspects described herein merely illustrate particular aspects of the disclosure. It should be appreciated that those skilled in the art will be able to devise various arrangements, which, although not explicitly described or shown herein, embody the principles of the disclosure and are included within its scope. Furthermore, all examples and conditional language recited herein are intended to be only for pedagogical purposes to aid the reader in understanding the principles of the disclosure. This disclosure and its associated references are to be construed as being without limitation to such specifically recited examples and conditions. Moreover, all statements herein reciting principles, aspects, and aspects of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be appreciated by those skilled in the art that the block diagrams herein represent conceptual views of illustrative circuitry, algorithms, and functional steps embodying principles of the disclosure. Similarly, it should be appreciated that any flow charts, flow diagrams, signal diagrams, system diagrams, codes, and the like represent various processes that may be substantially represented in computer-readable medium and so executed by a computer or processor, whether or not such computer or processor is explicitly shown.

The invention claimed is:

1. A method of communication, comprising:

obtaining an extended Golay code selected from a set of extended Golay codes;

modifying the extended Golay code;

generating a preamble using the modified extended Golay code; and transmitting the preamble.

2. The method of claim 1, further comprising generating the set of extended Golay codes based on a Golay code and a set of short sequences.

3. The method of claim 2, wherein each of the short sequences comprises at least one of a row of a Fourier Transform matrix and a Hadamard matrix.

4. The method of claim 3, wherein the Fourier Transform matrix or the Hadamard matrix has four rows and four columns.

5. The method of claim 2, wherein each of the extended Golay codes is generated by performing a Kronecker product of the Golay code and one of the set of short sequences.

6. The method of claim 2, wherein each of the short sequences comprises an inverse Fourier Transform of a Kronecker sequence.

7. The method of claim 2, wherein one of the set of short sequences comprises a sequence selected from a group consisting of:

[1 1 1 1];

[1 j −1 −j];

[1 −1 1 −1]; and

[1 −j −1 j].

8. The method of claim 1, wherein the set of extended Golay codes comprises Golay codes with zero periodic cross-correlation.

9. The method of claim 1, where the modification comprises cyclically filtering the extended Golay code with a time domain filter having a defined spectral mask.

10. The method of claim 1, where the modification comprises:

performing a Fast Fourier Transform (FFT) on the extended Golay code to create a set of subcarriers;

attenuating at least one subcarrier of the set of subcarriers; and performing an inverse FFT of the attenuated at least one subcarrier.

11. The method of claim 10, wherein the attenuation comprises zeroing out the at least one subcarrier of the set of subcarriers.

12. A communication apparatus, comprising:

means for obtaining an extended Golay code selected from a set of extended Golay codes;

means for modifying the extended Golay code;

means for generating a preamble using the modified extended Golay code; and means for transmitting the preamble.

13. The communication apparatus of claim 12, further comprising means for generating the set of extended Golay codes based on a Golay code and a set of short sequences.

14. The communication apparatus of claim 11, wherein each of the short sequences comprises at least one of a row of a Fourier Transform matrix and a Hadamard matrix.

15. The communication apparatus of claim 14, wherein the Fourier Transform matrix or the Hadamard matrix has four rows and four columns.

16. The communication apparatus of claim 11, wherein each of the extended Golay codes is generated by performing a Kronecker product of the Golay code and one of the set of short sequences.

17. The communication apparatus of claim 11, wherein each of the short sequences comprises an inverse Fourier Transform of a Kronecker sequence.

18. The communication apparatus of claim 11, wherein one of the set of short sequences comprises a sequence selected from a group consisting of:

[1 1 1 1];

[1 j −1 −j];

[1 −1 1 −1]; or

[1 −j −1 j].

19. The communication apparatus of claim 12, wherein the set of extended Golay codes comprises Golay codes with zero periodic cross-correlation.

20. The communication apparatus of claim 12, where the modification means comprises means for cyclically filtering the extended Golay code with a time domain filter having a defined spectral mask.

21. The communication apparatus of claim 12, where the modification means comprises:

means for performing a Fast Fourier Transform (FFT) on the extended Golay code to create a set of subcarriers;

means for attenuating at least one subcarrier of the set of subcarriers; and means for performing an inverse FFT of the attenuated at least one subcarrier.

22. The communication apparatus of claim 21, wherein the attenuation means comprises means for zeroing out the at least one subcarrier of the set of subcarriers.

23. A communication apparatus, comprising:

a processing system configured to:

obtain an extended Golay code selected from a set of extended Golay codes;

modify the extended Golay code;

generate a preamble using the modified extended Golay code; and transmit the preamble.

24. The communication apparatus of claim 12, wherein the processing system is further configured to generate the set of extended Golay codes based on a Golay code and a set of short sequences.

25. The communication apparatus of claim 11, wherein each of the short sequences comprises at least one of a row of a Fourier Transform matrix and a Hadamard matrix.

26. The communication apparatus of claim 14, wherein the Fourier Transform matrix or the Hadamard matrix has four rows and four columns.

27. The communication apparatus of claim 11, wherein each of the extended Golay codes is generated by performing a Kronecker product of the Golay code and one of the set of short sequences.

28. The communication apparatus of claim 11, wherein each of the short sequences comprises an inverse Fourier Transform of a Kronecker sequence.

29. The communication apparatus of claim 11, wherein one of the set of short sequences comprises a sequence selected from a group consisting of:

[1 1 1 1];

[1 j −1 −j];

[1 −1 1 −1]; or

[1 −j −1 j].

30. The communication apparatus of claim 12, wherein the set of extended Golay codes comprises Golay codes with zero periodic cross-correlation.

31. The communication apparatus of claim 12, wherein the processing system is further configured to cyclically filter the extended Golay code with a time domain filter having a defined spectral mask.

32. The communication apparatus of claim 12, wherein the processing system is further configured to:

perform a Fast Fourier Transform (FFT) on the extended Golay code to create a set of subcarriers;

attenuate at least one subcarrier of the set of subcarriers; and perform an inverse FFT of the attenuated at least one subcarrier.

33. The communication apparatus of claim 21, wherein the processing system is further configured to zero out the at least one subcarrier of the set of subcarriers.

34. A computer-program product for wireless communications comprising:

a machine-readable medium encoded with instructions executable to:

obtain an extended Golay code selected from a set of extended Golay codes;

modify the extended Golay code;

generate a preamble using the modified extended Golay code; and transmit the preamble.

35. A piconet coordinator comprising:

an antenna; and a processing system configured to:

obtain an extended Golay code selected from a set of extended Golay codes;

modify the extended Golay code;

generate a preamble using the modified extended Golay code; and transmit the preamble via the antenna.

* * * * *